(12) United States Patent
Davis et al.

(10) Patent No.: US 9,075,802 B2
(45) Date of Patent: Jul. 7, 2015

(54) DYNAMIC ONLINE PRESENTATION OF SOLUTIONS BASED ON CUSTOMER SYMPTOMS

(75) Inventors: Natalie Malaszenko Davis, Lexington, TX (US); Eric Jason Erway, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 746 days.

(21) Appl. No.: 12/204,928

(22) Filed: Sep. 5, 2008

(65) Prior Publication Data

US 2010/0077008 A1 Mar. 25, 2010

(51) Int. Cl.
*G06F 17/30* (2006.01)

(52) U.S. Cl.
CPC ............................ *G06F 17/30011* (2013.01)

(58) Field of Classification Search
CPC ...................... G06F 17/30106; G06F 17/30424
USPC .................................................. 707/706, 769
See application file for complete search history.

(56) References Cited

U.S. PATENT DOCUMENTS

| | | | |
|---|---|---|---|
| 6,321,262 B1 | 11/2001 | Springer | |
| 6,606,716 B1 | 8/2003 | Vrhel, Jr. et al. | |
| 6,640,153 B2 * | 10/2003 | Kwak | 700/138 |
| 6,965,865 B2 * | 11/2005 | Pletz et al. | 705/346 |
| 7,792,889 B1 * | 9/2010 | Lee et al. | 707/948 |
| 7,881,703 B2 * | 2/2011 | Roundtree et al. | 455/414.1 |
| 2002/0087882 A1 * | 7/2002 | Schneier et al. | 713/201 |
| 2003/0033387 A1 * | 2/2003 | Adams et al. | 709/220 |
| 2004/0068497 A1 * | 4/2004 | Rishel et al. | 707/5 |
| 2005/0096924 A1 * | 5/2005 | Enis et al. | 705/1 |
| 2005/0097070 A1 * | 5/2005 | Enis et al. | 706/50 |
| 2006/0069577 A1 | 3/2006 | Schmitt et al. | |
| 2006/0069578 A1 | 3/2006 | Borkowski et al. | |
| 2006/0241957 A1 | 10/2006 | Boswell | |
| 2007/0019617 A1 | 1/2007 | Hancock et al. | |
| 2007/0019801 A1 | 1/2007 | Brenneman et al. | |
| 2007/0027893 A1 * | 2/2007 | Gundy et al. | 707/102 |
| 2007/0150812 A1 * | 6/2007 | Hu | 715/705 |
| 2007/0168726 A1 * | 7/2007 | Amos | 714/25 |
| 2008/0097507 A1 * | 4/2008 | Fogarty et al. | 606/190 |
| 2008/0198749 A1 | 8/2008 | Nguyen et al. | |
| 2009/0030856 A1 * | 1/2009 | Arena et al. | 706/11 |
| 2009/0094350 A1 | 4/2009 | Rive et al. | |
| 2010/0077008 A1 * | 3/2010 | Davis et al. | 707/797 |

\* cited by examiner

*Primary Examiner* — Noosha Arjomandi
(74) *Attorney, Agent, or Firm* — Terrile, Cannatti, Chambers & Holland, LLP; Stephen A. Terrile

(57) ABSTRACT

A knowledge management system is disclosed providing the ability to use an issue's symptoms as search criteria for potential solutions within a solution network. User, system, and diagnostics information is received by the solution network. Symptoms of the issue are provided, which are then used with the user, system, diagnostics, and additional information to search the solution network for potential solutions.

27 Claims, 26 Drawing Sheets

DYNAMIC ONLINE PRESENTATION OF SOLUTIONS BASED ON CUSTOMER SYMPTOMS

BACKGROUND OF THE INVENTION

1. Field of the Invention

The present invention relates to the field of customer support and more particularly to knowledge management systems for use with customer support systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as home and business computers continue to proliferate. As a result, the provision of timely and effective diagnostic, support, and maintenance services to end users has become an important issue for manufacturers and sellers of computer systems. It is not uncommon for end users to experience difficulties with their systems, whether they are novices or experienced users attempting to add or reconfigure existing systems. For example the system might lock up or a peripheral of the computer system, such as a hard drive, disk drive, or printer, may not function properly. In other cases, the computer system may not recognize the peripheral. The solution to these sorts of problems may be as simple as providing power to the affected peripheral or reconnecting it to the computer system. In other cases, it may be necessary to install a driver update or software patch or the computer system hardware or software may need to be reconfigured. However, some problems are more difficult to diagnose and remedy.

In the past, users were typically limited to diagnosing and correcting an issue by consulting a user manual that was included with the system or peripheral when it was purchased. These manuals typically include troubleshooting tables or guides that attempt to diagnose a user's problem on the basis of symptoms recognized by the user. However, the effectiveness of the user's manual in helping to identify and correct the problems encountered depends in large part on the clarity and completeness of the user's manual and the skill of the computer user. An inexperienced user may have difficulty in locating the source of the problem and in following the often confusing instructions in the user's manual. Moreover, user's manuals are often deficient in that they do not address every potential difficulty encountered by the user nor are they easily updated.

As an alternative, or in addition to consulting a user's manual, a user experiencing difficulty with a system may consult diagnostic and support software stored locally on the system. The effectiveness of locally stored diagnostic software is limited in that these software programs generally display text files that have information similar to that found in user's manuals. Another limitation is that such diagnostics are typically not updated once they are installed on the system at the factory. As a result, users attempting to diagnose computer system problems through locally stored software programs face limitations similar to those encountered when using a user's manual that has not been updated.

Alternatively, users may have access to a support or help line. A support or help line requires that the user contact a support technician or specialist at a central site. The support technician listens to the symptoms the user is experiencing and attempts to diagnose the problem. This process often involves the support technician stepping the user through a series of diagnostic tests. If appropriate, the support technician may provide the user with instructions or tips for correcting the problem. The effectiveness of such interpersonal diagnostic and support services depends in large part on the skill of the user being assisted. Regardless of the skill and knowledge of the support technician, the user will nevertheless have to correctly describe the problem being experienced, assist the support technician in diagnosing the problem, and perform the fix or correction suggested by the support technician.

As another alternative, users can sometimes consult an on-line support site provided and maintained by the manufacturer or seller of their computer system or peripherals. However, customers are often challenged when navigating these sites. For example, current approaches include decision trees that present questions and choices to the customer in an attempt to diagnose their problem. However, responses to such decision trees often result in generalized, vague, ambiguous, or even incomprehensible suggestions that fail to provide conclusive resolution of the customer's issue. Other navigation issues are created when problem resolution information is categorized by a summary of the solution instead of a description of the symptoms it addresses. As another example, a customer may enter search terms describing the symptoms of their problem into a support site's search page. Instead of receiving a list of possible solutions, they receive a list of Web pages or articles that contain the same string of search terms and words. Accordingly, end-users can experience difficulty and frustration when trying to troubleshoot and resolve their computer system issues, which in turn can lead to an unsatisfactory customer support experience.

SUMMARY OF THE INVENTION

In accordance with the present invention, a knowledge management system is provided which includes the ability to use an issue's symptoms as search criteria for potential solutions within a solution network. In various embodiments, a solution network comprises a knowledge management system and a plurality of solution resources. In these and other embodiments, user information, system information, and any diagnostics information generated by on-the-box (OTB) diagnostics running on the user's system is received by the solution network.

The user then provides symptoms of the issue, which are then used as with other information to search the solution network for potential solutions. In one embodiment, the symptoms provided by the user are used as search terms. In another embodiment, the symptoms comprise natural language which is used to generate a search query. In one embodiment, provision of the issue's symptoms by the user is guided by business rules. In another embodiment, the user is guided by a wizard to provide the issue's symptoms. In yet another embodiment, the user selects symptoms from a selection of possible symptoms. In one embodiment, the selection of possible symptoms is presented in a tree format.

The previously submitted user and system information is then used by the knowledge management system to retrieve additional user information, system information, and issue resolution history relating to the user and their system. Once retrieved, the additional information is combined with the previously submitted information and issue symptoms for analysis. The analysis is then used to search the solution network for potential solutions to the issue. The resulting potential solutions and their associated solution resources are then filtered to determine which solutions were previously provided to the user, by which solution resource(s). In one embodiment, the filtered potential solutions and their associated solution resources are presented to the user through a user portal of the solution network. In another embodiment, the user is automatically routed by the solution network to a predetermined solution resource based upon the foregoing analysis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6a-m are a flowchart for interactively providing potential solutions from within a solution network in response to the receipt of an issue;

DETAILED DESCRIPTION

A knowledge management system is provided which includes the ability to use an issue's symptoms as search criteria for potential solutions within a solution network. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
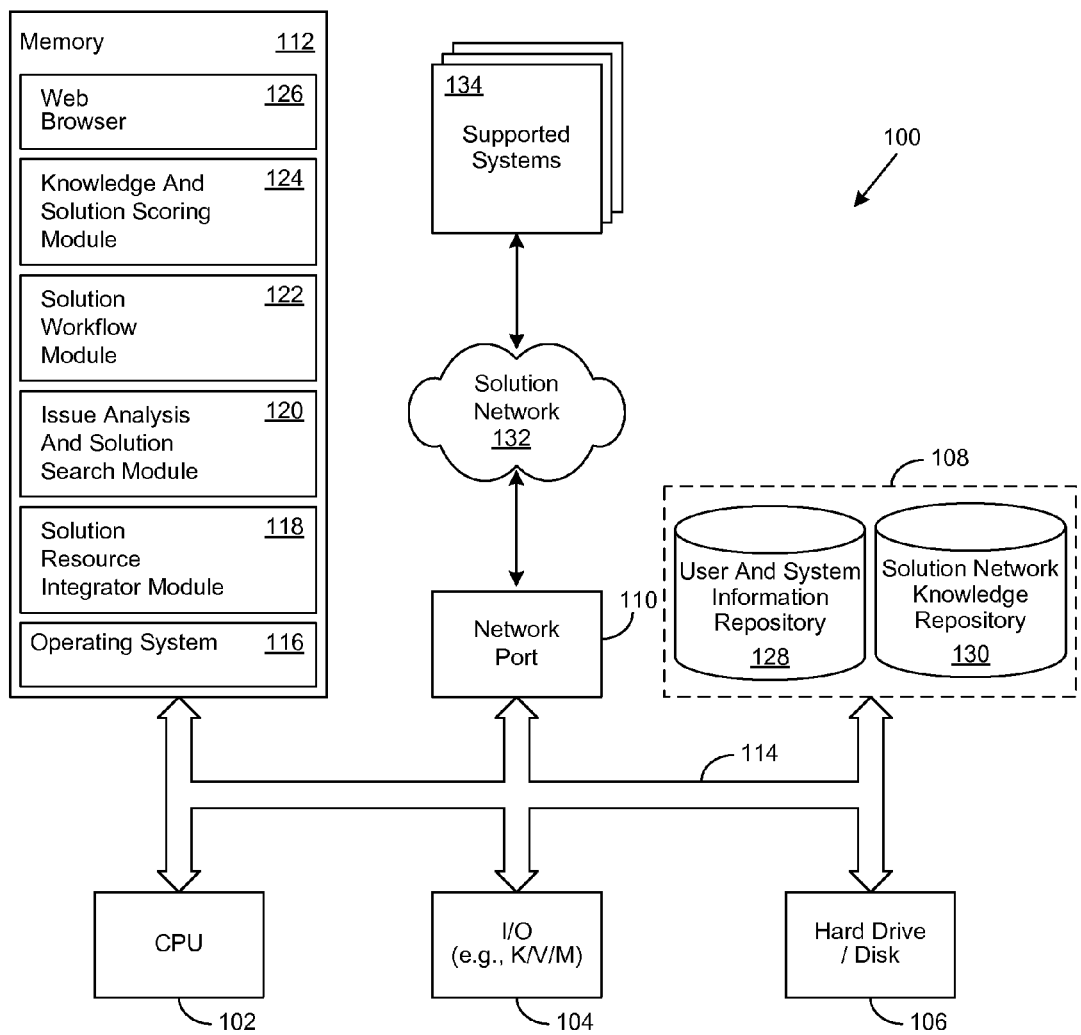
FIG. 1 is a generalized illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, various other storage subsystems 108. In one embodiment, other storage subsystems 108 comprises user and system information repository 128 and a solution network knowledge repository 130. In various embodiments, the information handling system 100 also includes network port 110 operable to connect to a solution network 132, which is likewise accessible by supported systems 134. The information handling system 100 likewise includes system memory 112, which is interconnected to the foregoing via one or more buses 114. System memory 112 further comprises operating system (OS) 116, a solution resource integrator module 118, an issue analysis and solution search module 120, a solution workflow module 122, a knowledge and solution scoring module 124, and a Web browser 126.

Figure 2:
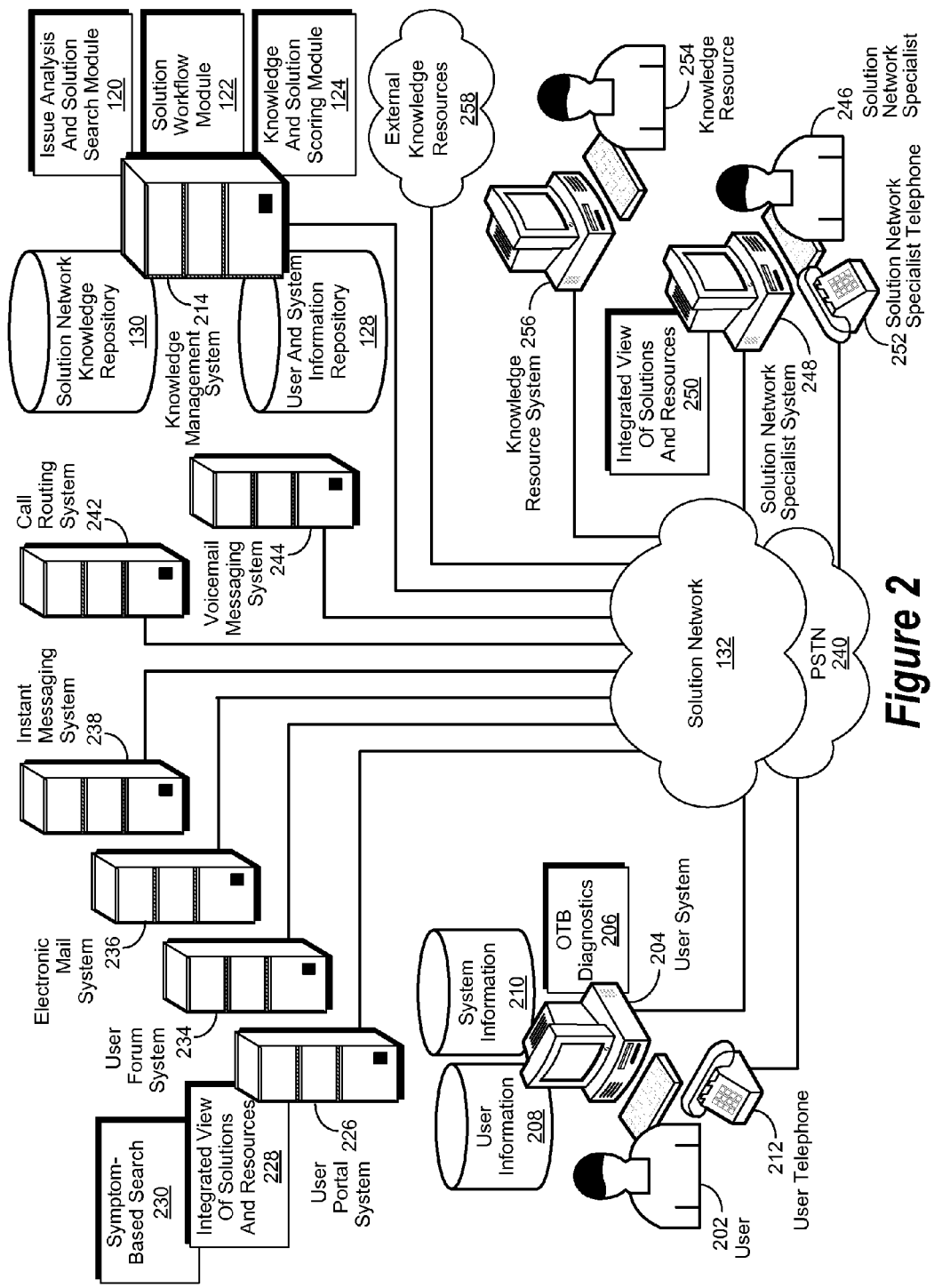
FIG. 2 is a simplified block diagram of solution resources as implemented within a solution network to provide potential solutions to an issue.

FIG. 2 is a simplified block diagram of solution resources as implemented within a solution network to provide potential solutions to an issue. In various embodiments, the solution network 132 comprises a plurality of solution resources, including a user forum system 234, an electronic mail (email) system 236, and an instant messaging (IM) system 238. The solution resources of the solution network 132 also comprise a call routing network system 242, and a voicemail messaging system 244. The solution network further comprises a knowledge management system 214, a plurality of knowledge resources 254, knowledge resource systems 256, and external knowledge resources 258. The knowledge management system 214 further comprises a solution network knowledge repository 130 and a user and system information repository 128. The knowledge management system 214 likewise comprises an issue analysis and solution search module 120, a solution workflow module 122, and a knowledge and solution scoring module 124.

In various embodiments, solution knowledge is generated by a knowledge resource 254 or knowledge resource system 256 of the solution network 132, or by an external knowledge resource 258. As used herein, solution knowledge is defined as any information operable to provide a solution to an issue. In one embodiment, the provided solution is tailored to provide a user-specific solution. As likewise used herein, a knowledge resource 254, 256, 258 is defined as any entity or system operable to generate a solution from a body of knowledge. In one embodiment, a knowledge resource 254, 256, 258 generates a solution to an identified issue when one does not currently exist. In another embodiment, a plurality of knowledge resources 254, 256, 258 are further operable to work collaboratively to generate a solution. In one embodiment, the usefulness of the knowledge resource 254, 256, 258 in resolving an issue is scored by the knowledge and solution scoring module 124. The resulting knowledge usefulness score is then indexed to the received issue and its originating knowledge resource(s) 254, 256, 258.

In these and other embodiments, an issue is identified on a system 204 of user 202. In one embodiment, the user 202 identifies the issue. In another embodiment, an on-the-box (OTB) monitor running on the user's system 204 identifies the issue. As an example, the user 202 may be unable to play a digital versatile disk (DVD) on their system 204, and as a result, identify an issue. As another example, an OTB monitor running on the user's system 204 may detect the failure of the system's DVD drive and alert the user 202 before the user tries to play a DVD in the failed drive.

In one embodiment, a network connection is established between the user's system 204 and the solution network 132, and the user 202 is then provided access to a user portal system 226. User information 208, system information 210 and any diagnostics information generated by the OTB diagnostics 206 is automatically submitted by the user's system 204 to the user portal system 226 of the solution network 132. In various embodiments, system information includes system issue symptoms, system configuration information, system diagnostic information, system operating information, system service history information, and other system information required by the solution network 132. It will be appreciated that in various embodiments, OTB diagnostics 206 information, when combined with user information 208 and system information 210, is operable to generate issue symptom information. In one embodiment, the symptoms of the issue are manually provided by the user 202 to the user portal system 226 and then used by the issue analysis and solution search module 120 to perform a symptom-based search 230 for potential solutions. In another embodiment, the provided symptoms comprise natural language, which is then used by the issue analysis and solution search module 120 to perform a natural language search query.

The submitted information is then used by the knowledge management system 214 to retrieve additional user information, system information, and issue resolution history from the user and system information repository 128 and the solution network knowledge repository 130. In various embodiments, the retrieved user information is linked to the solution network 132 and is operable to generate knowledge for the solution network 132 and to tailor user-specific solutions. In these embodiments, the retrieved user information includes system order information, system purchase information, system configuration information, user configuration information, previously provided solutions, historical issue resolution information, and historical solution resources providing the resolution information.

Once retrieved, the additional user information, system information, and issue resolution history is analyzed by the issue analysis and solution search module 120 and potential solutions to the user's issue are determined. The potential solutions are then filtered to indicate which solutions were previously provided to the user 202, by which solution resource(s) 234, 236, 238, 242, 244, then cross-referenced to the issue resolution history, all of which is auto-populated in an issue resolution record. In one embodiment, an integrated view of potential solutions and internal and external solution resources 228 is generated and then presented through the user portal system 226 to the user 202. In various embodiments, the integrated view 228 is respectively ordered by issue resolution, solution resource effectiveness, and knowledge resource usefulness scores.

In one embodiment, the user portal system 226 provides the user 202 a choice of being auto-routed by the solution network 132 to a predetermined solution resource 234, 236, 238, 242, 244 or selecting a preferred solution resource 234, 236, 238, 242, 244. In one embodiment, the auto-routing comprises a sequence of workflow steps performed by the solution workflow module 122. In another embodiment, the user 202 uses a telephone 212 to place a call to the solution network 132 via the public switched telephone network (PSTN) 240. Once connected, a solution network specialist 246 receives user information 208, system information 210, and issue symptoms from the user 202 via their telephone 252. As used herein, a solution network specialist 246 is any entity operable to either act as a solution resource, access other solution resources, or collaborate with other solution resources, to provide a potential solution to an issue. In one embodiment, an integrated view of potential solutions and internal and external solution resources 250 is generated and then presented to the solution network specialist 246 through their system 248.

In various embodiments, feedback is requested from the user 202 once they have been provided a potential solution, whether by the user portal system 226 or a solution network specialist 246. The user's feedback is received and then used by the knowledge and solution scoring module 124 to score the success of the solution network 132 in resolving the issue and the corresponding effectiveness of the solution resource(s) providing the solution. Once scoring is completed, the solution network knowledge repository 130 is updated with the scores.

Figure 3:
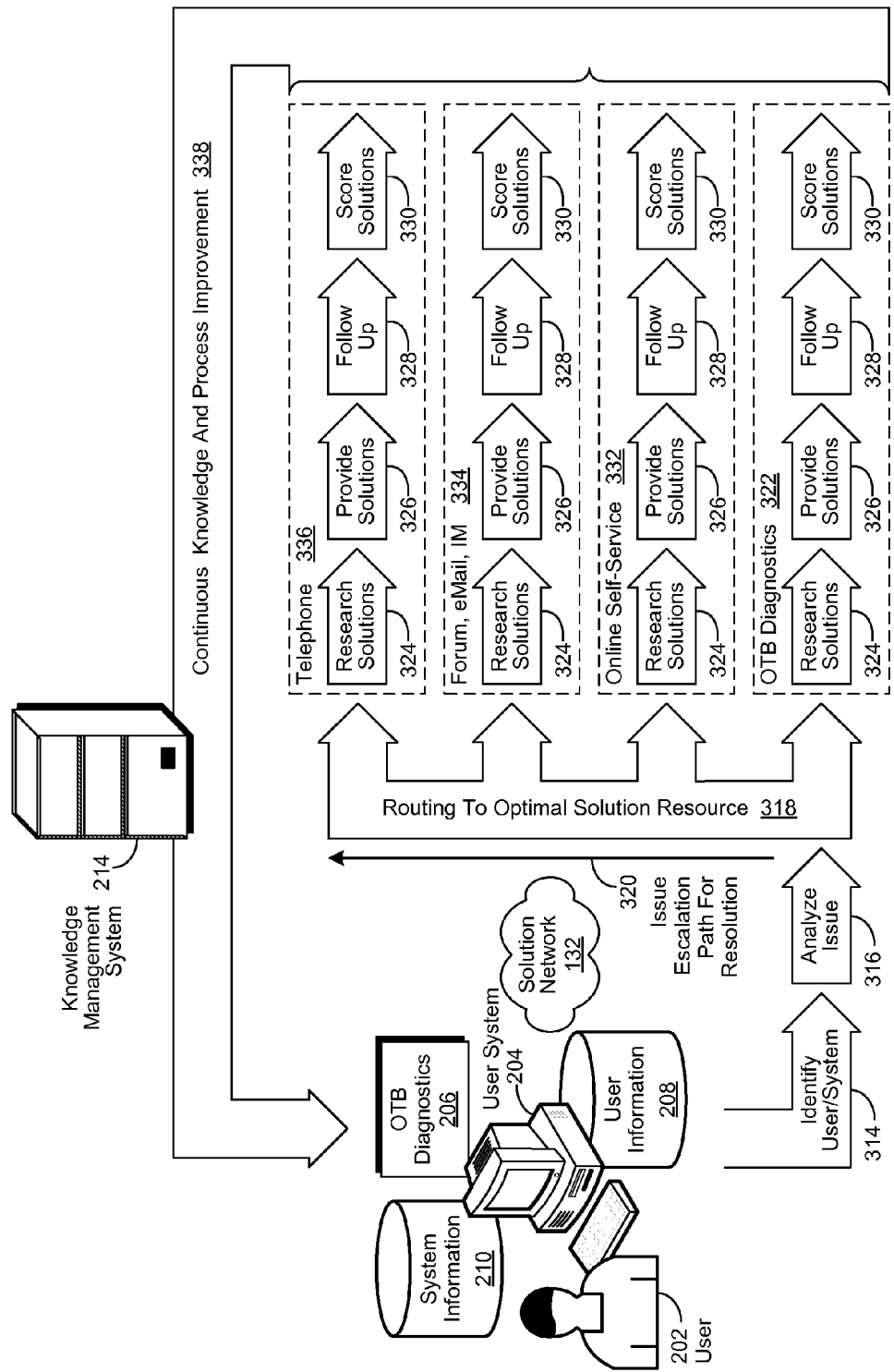
FIG. 3 is a simplified block diagram of routing an issue to solution resources within a solution network.

FIG. 3 is a simplified block diagram of routing an issue to solution resources within a solution network. In various embodiments, solution network 132 comprises a knowledge management system 214 and a plurality of solution resources including on-the-box (OTB) system diagnostics 322 and an online self-service portal 332. The plurality of solution resources also includes community forum, electronic mail (email), and instant messaging (IM) sessions 334, as well as telephone support 336 through a solution network specialist. Each of the solution resources 322, 332, 334, 336 comprises a plurality of issue resolution steps, including researching potential solutions 324, followed by the provision of potential solutions 236. The issue resolution steps likewise include following up on the success of a provided solution 328, and scoring the provided solution 330 based upon its effectiveness in resolving the issue.

In these and other embodiments, issues are received from a user 202, along with user information 208, system information 210, and any diagnostics information generated by OTB diagnostics 206 running on the user's system 204. The submitted information is then used by the knowledge management system 214 to identify 314 the user 202 and their system 204. Once identified, additional user information, system information, and issue resolution history relating to the user 202 and their system 204 is retrieved. Once retrieved, the additional user information, system information, and issue resolution history is analyzed 316 and potential solutions to the user's issue are determined. The potential solutions are then filtered to determine which solutions were previously provided to the user 202, by which solution resource(s), then cross-referenced to the issue resolution history.

In one embodiment, the user 202 is automatically routed 318 by the solution network 132 to a predetermined solution resource 322, 332, 334, 336 based upon the foregoing analysis of their issue. The issue resolution steps 324, 326, 328, 330 of the selected solution resource 322, 332, 334, 336 are then performed. If the follow-up step 328 indicates that the solution provided in step 326 was unsuccessful, then the issue is escalated 320 to other solution resources 322, 332, 334, 336. As each of the issue resolution steps 324, 326, 328, 330 are performed, the knowledge management system 214 is updated for continuous knowledge and process improvement 338.

In various embodiments, feedback is requested from the user 202 which is then used to score the success of the solution network 132 in resolving the issue and the corresponding effectiveness of the solution resource(s) providing the solution. Once scoring is completed, the knowledge management system 130 is updated with the scores, which are then used in subsequent analyses of issues received by the solution network 132.

Figure 4A:
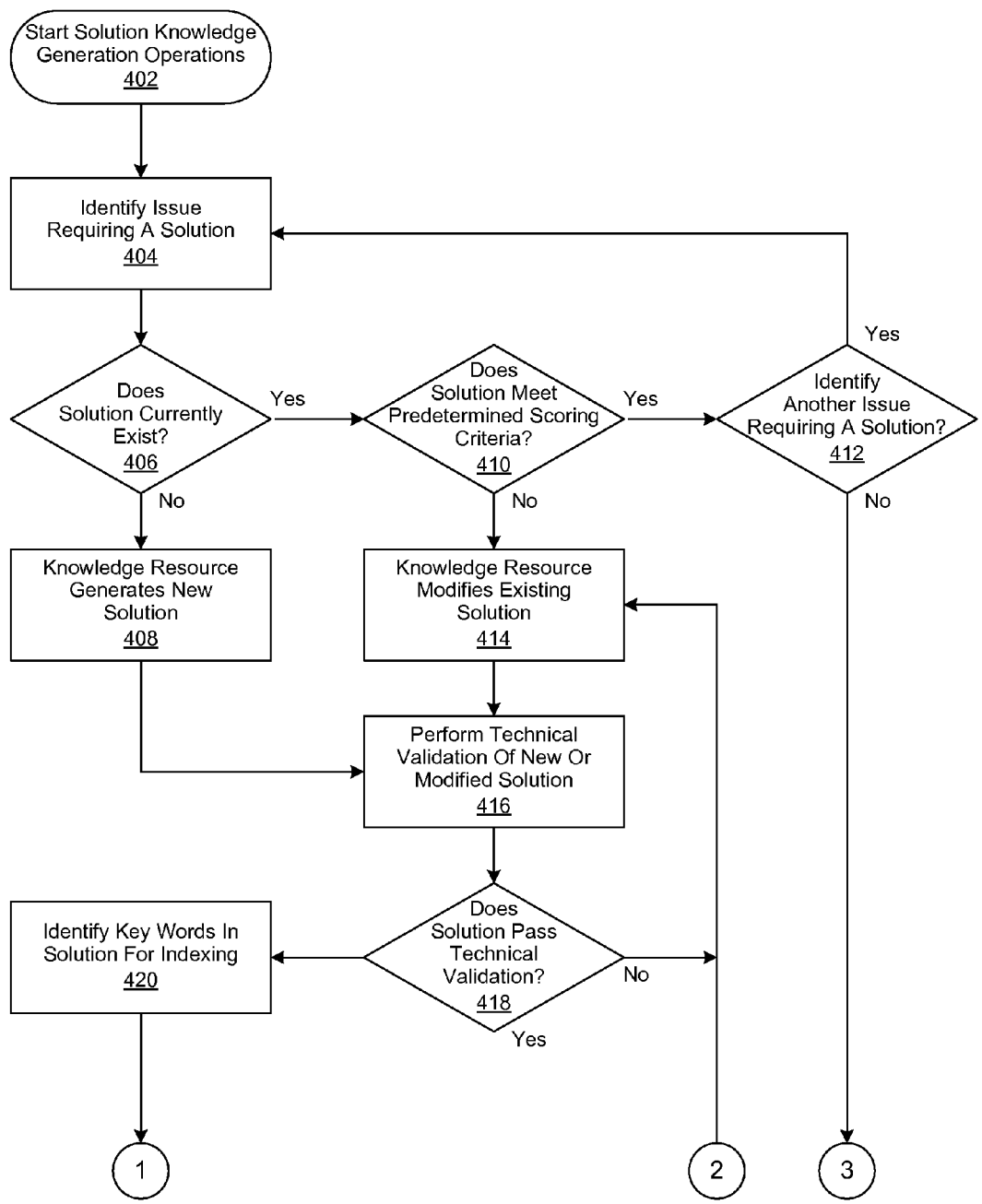
FIGS. 4a-b are a flowchart for generating solution knowledge and receiving solution knowledge usefulness feedback.
Figure 4B:
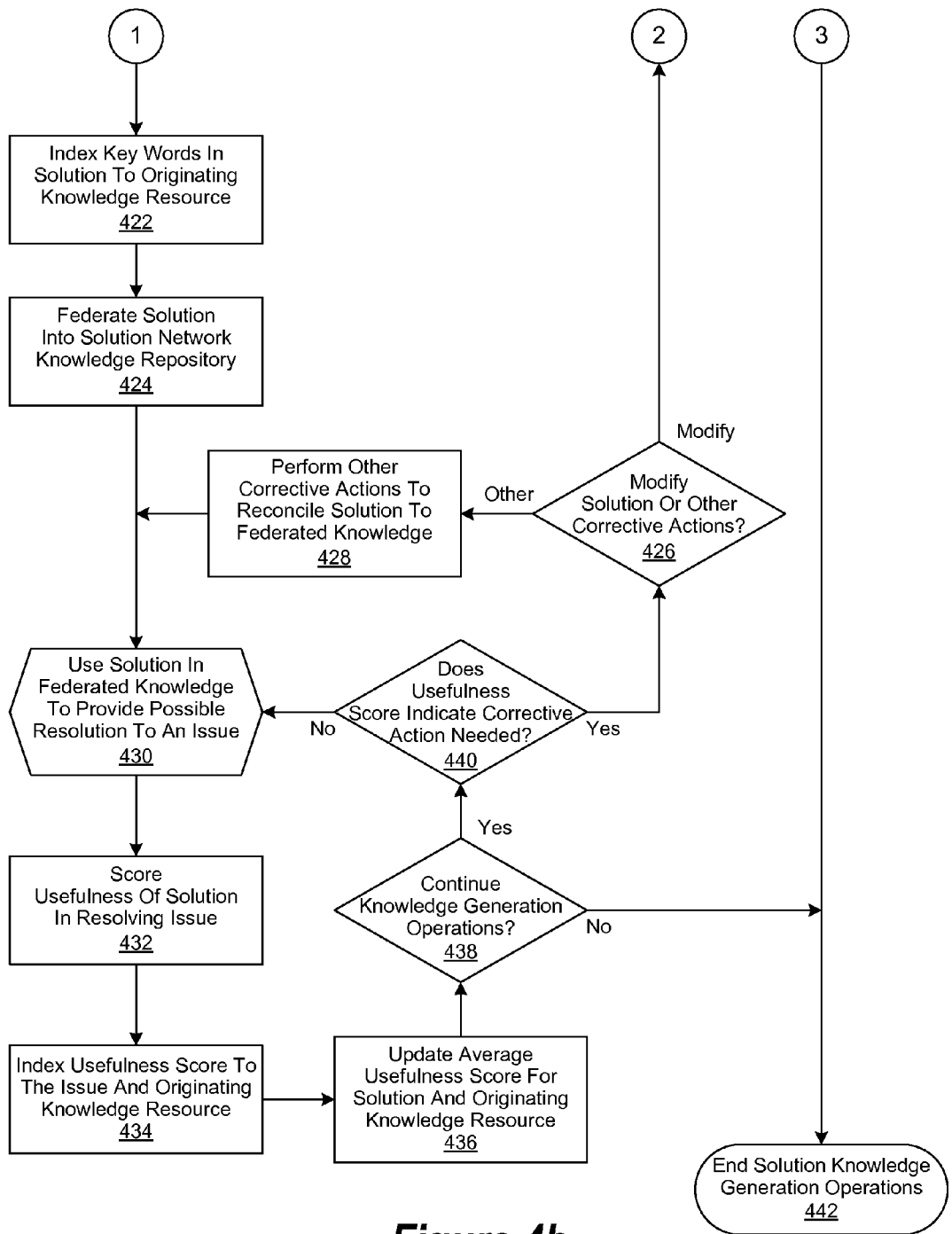

FIGS. 4*a*-*b* are a flowchart for generating solution knowledge and receiving solution knowledge usefulness feedback. In an embodiment of the invention, solution knowledge generation operations are begun in step 402, followed by the identification in step 404 of an issue requiring a solution. As used herein, solution knowledge is defined as any information operable to provide a solution to an issue. In one embodiment, the provided solution is tailored to provide a user-specific solution. A determination is then made in step 406 whether a solution to the identified issue currently exists. If so, then a determination is made in step 410 whether the existing solution meets predetermined scoring criteria. If so, then a determination is made in step 412 whether to identify another issue requiring a solution. If not, then solution knowledge generation operations are ended in step 422. Otherwise, the process continues, proceeding with step 404.

However, if it is determined in step 406 that a solution to the identified issue does not currently exist, then a knowledge resource generates a new solution in step 408. As used herein, a knowledge resource is defined as any entity or system operable to generate a solution from a body of knowledge. In one embodiment a plurality of knowledge resources are further operable to work collaboratively to generate a solution. However, if it is determined in step 406 that a solution to the identified issue does not currently exist, and it is further determined in step 410 that the existing solution does not meet predetermined scoring criteria, then the existing solution is modified by a knowledge resource in step 414. Once a new solution to the identified issue is generated in step 408, or an existing solution is modified in step 414, then technical validation is performed on the solution in step 416.

A determination is then made in step 418 whether the generated or modified solution passes the aforementioned technical validation. If not, then the process continues, proceeding with step 414, where the solution is modified by a knowledge resource. Otherwise, key words within the solution are indexed in step 422 to the knowledge resource(s) that originated the solution. The solution is then federated into a solution network knowledge repository in step 424. As used herein, federating refers to the transparent and logical integration of a plurality of autonomous knowledge resources into a single, virtual knowledge resource. Once federated, the solution is then used in step 430 to provide possible resolution to an issue received by the solution network.

After the solution is used, its usefulness in resolving the issue is scored in step 432. The resulting knowledge usefulness score is then indexed to the received issue and its originating knowledge resource(s) in step 434. The average knowledge usefulness score is then updated in step 436 for the solution and its originating knowledge resource(s) in step 436. A determination is then made in step 438 whether to continue solution knowledge generation operations. If so, then a determination is made in step 440 whether the solution's average usefulness score indicates that corrective action is needed to reconcile the solution to the federated knowledge of the solution network. As used herein, reconciling is defined as resolving inconsistencies, omissions, and errors of the solution as it relates to other solutions within the federated knowledge of the solution network. In one embodiment, the corrective action for reconciliation comprises a plurality of workflow steps. If it is determined in step 440 that corrective action is not needed, then the process continues, proceeding with step 430. Otherwise, a determination is made in step 426 whether the solution requires modification or other corrective actions. If it is determined in step 426 that the solution requires modifications, then the process continues, proceeding with step 414. Otherwise, other corrective actions are performed in step 428 and the process continues, proceeding with step 430. However, if it is determined in step 438 to end solution knowledge generation operations, then they are ended in step 442.

Figure 5A:
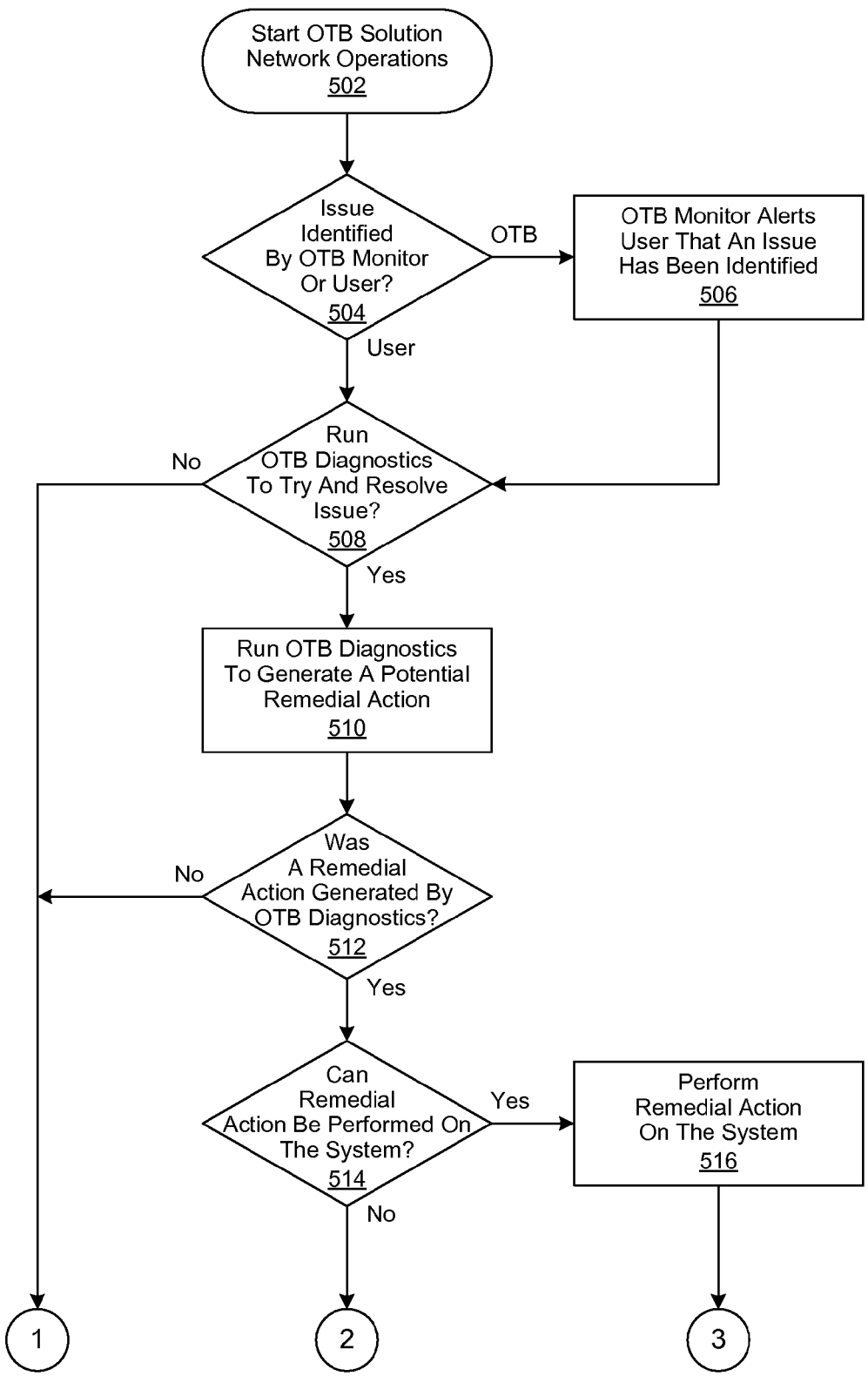
FIGS. 5a-c are a flowchart for providing potential on-the-box (OTB) solutions from within a solution network in response to the receipt of an issue.
Figure 5B:
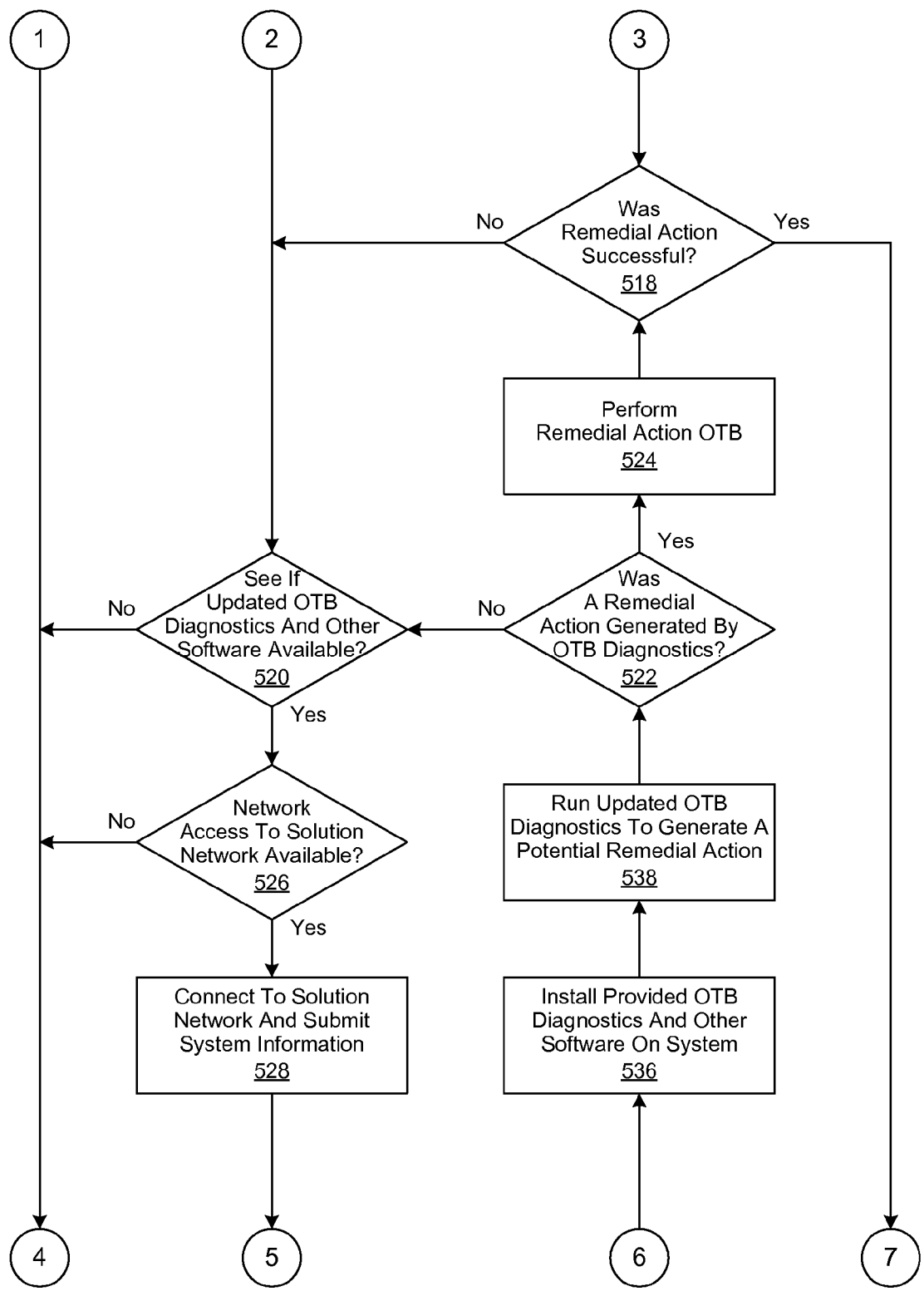
Figure 5C:
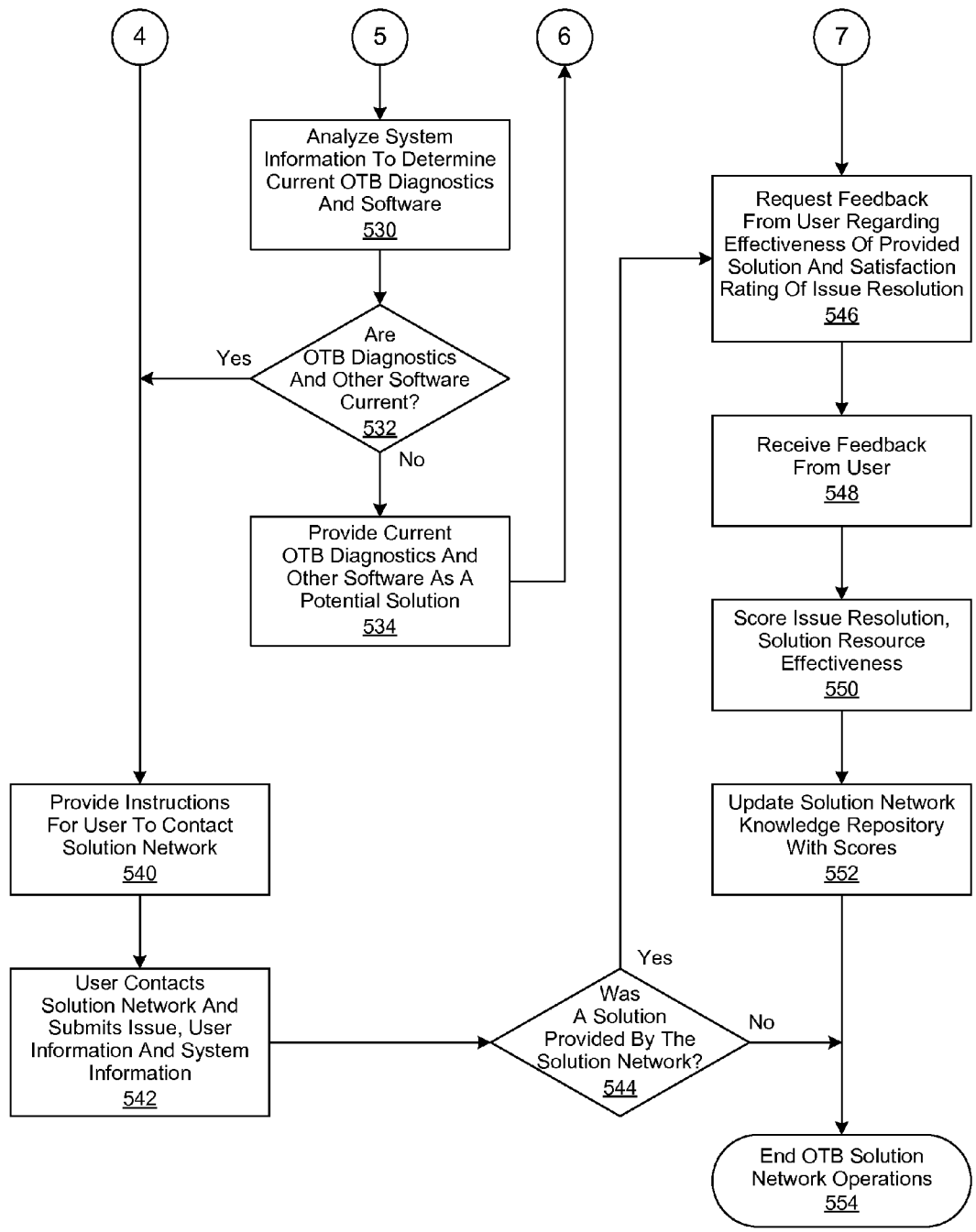
Figure 6A:
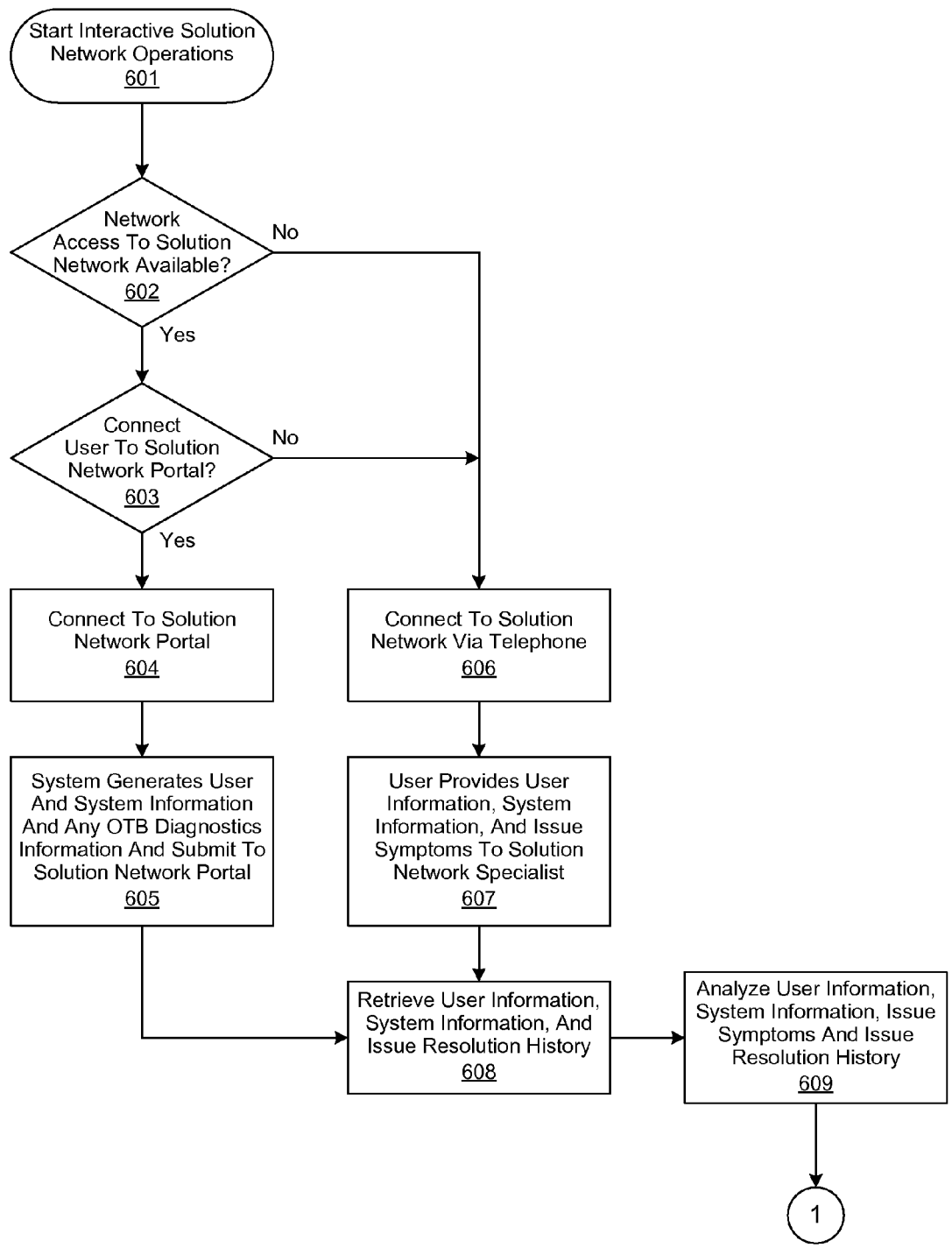
Figure 6B:
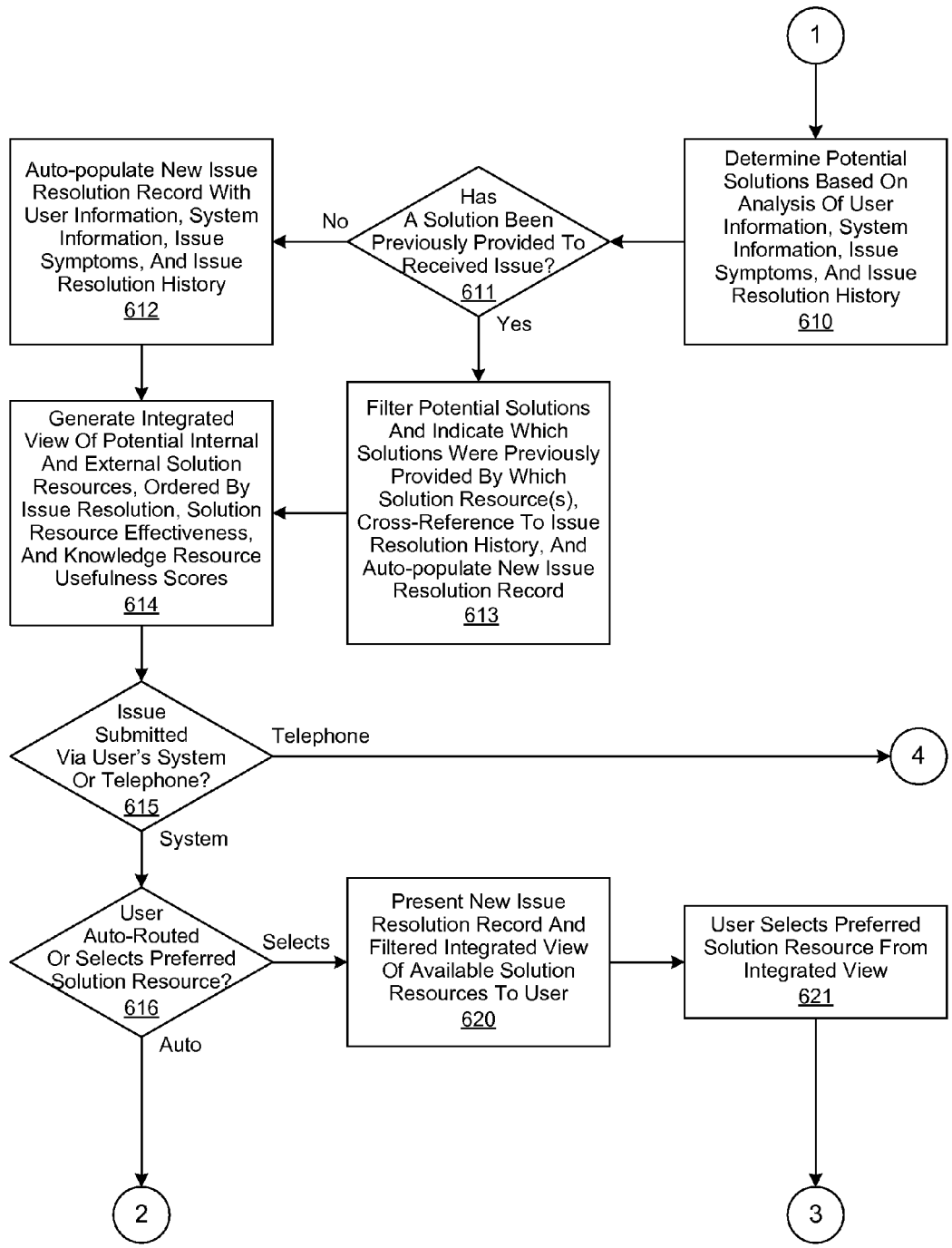
Figure 6C:
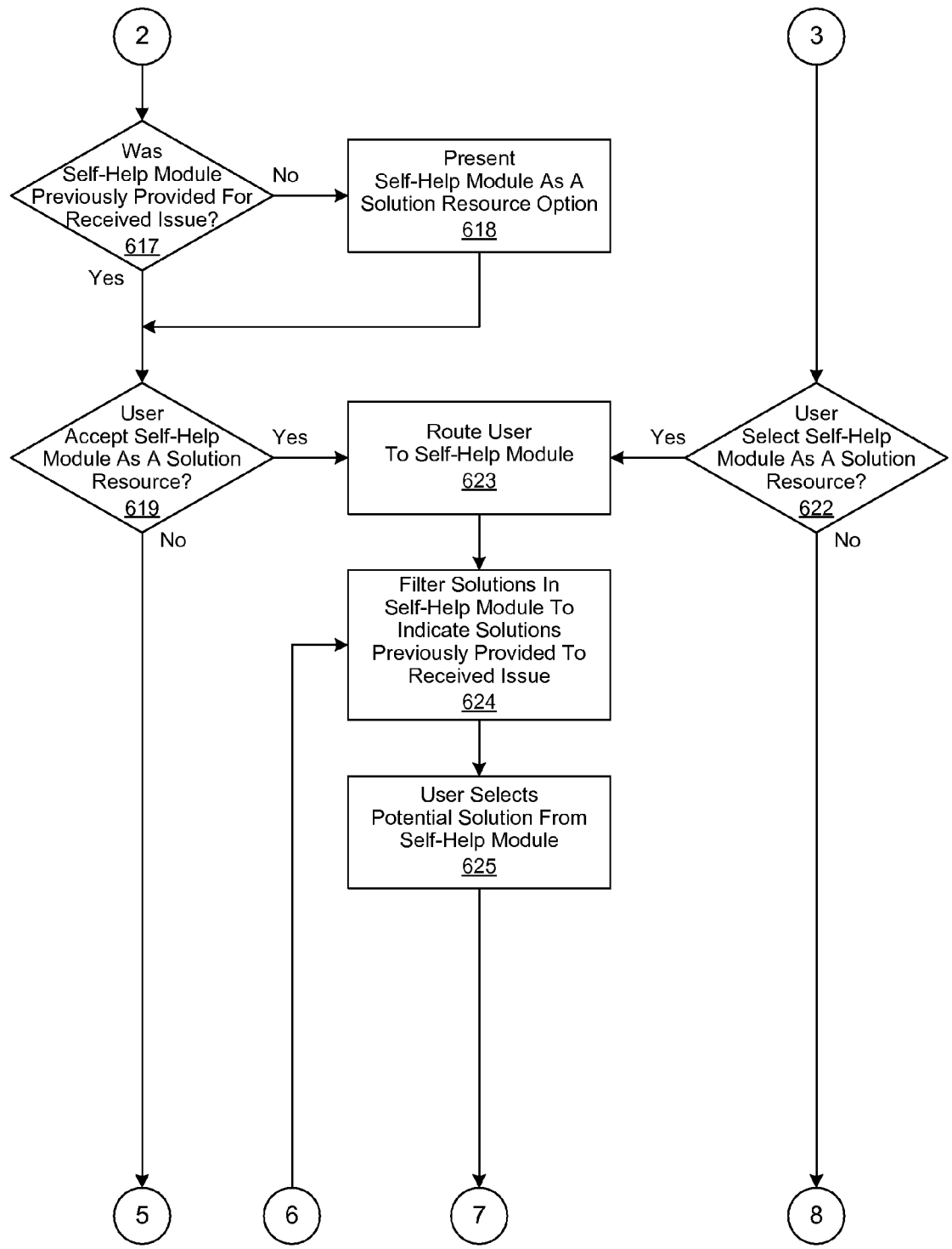
Figure 6D:
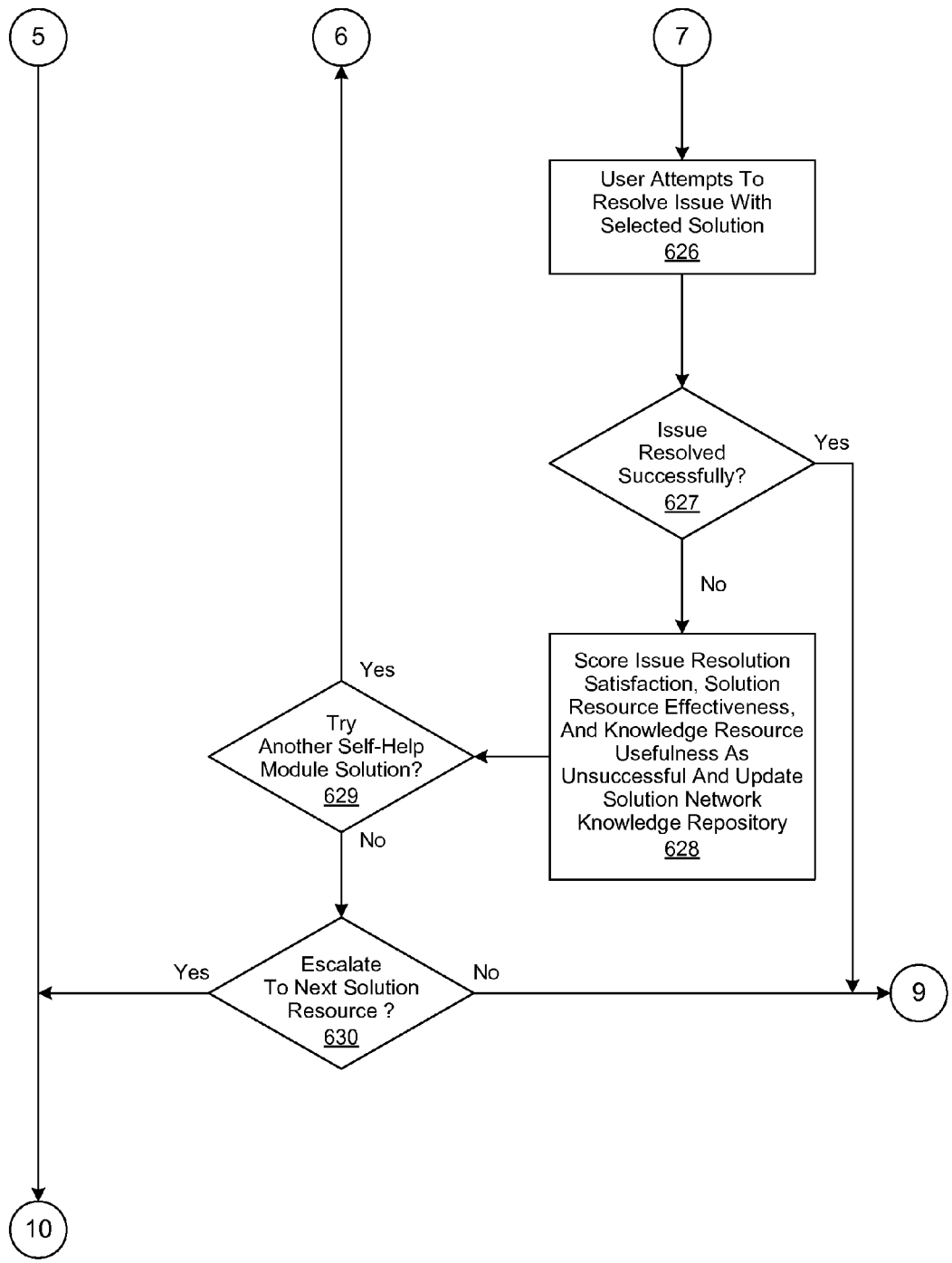
Figure 6E:
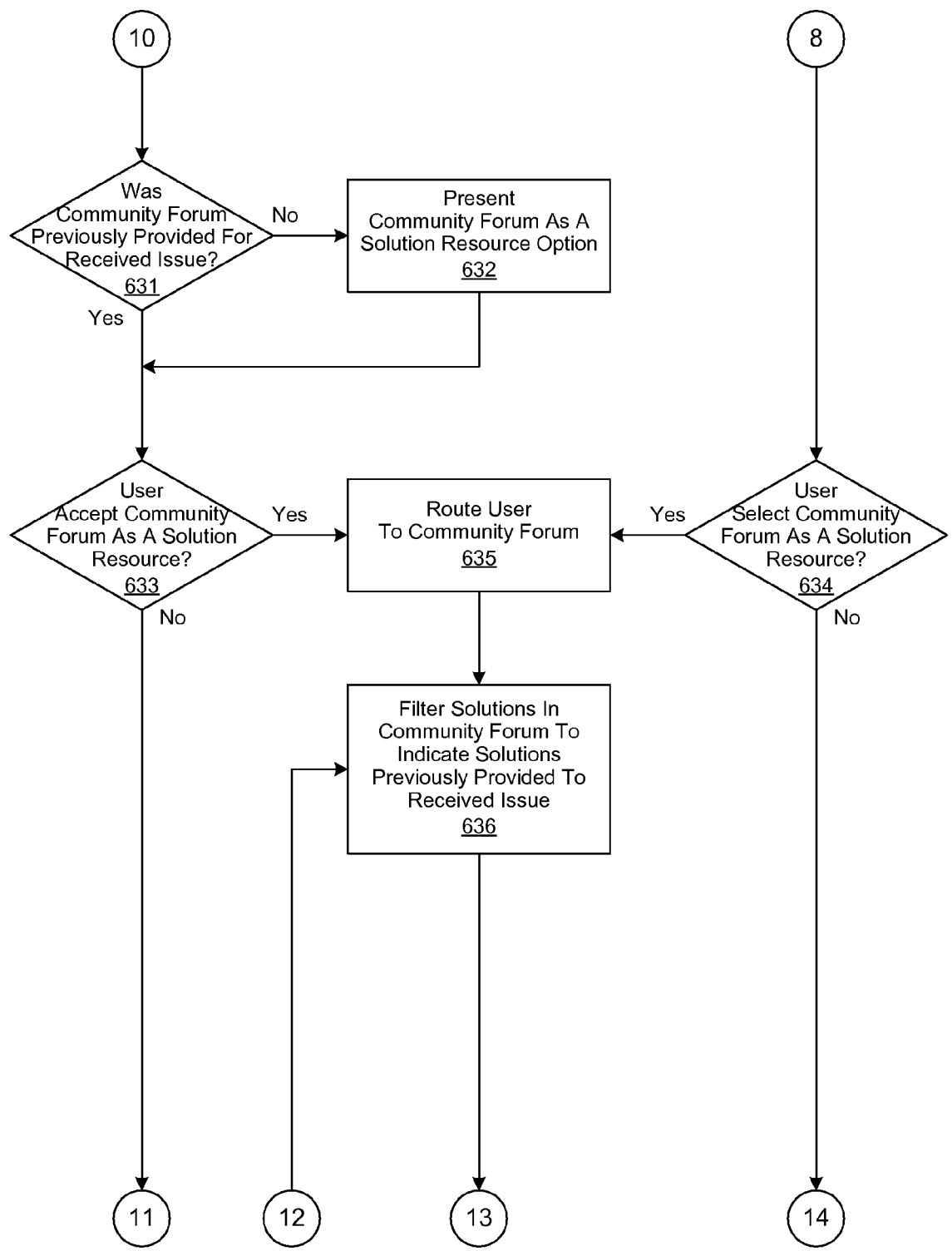
Figure 6F:
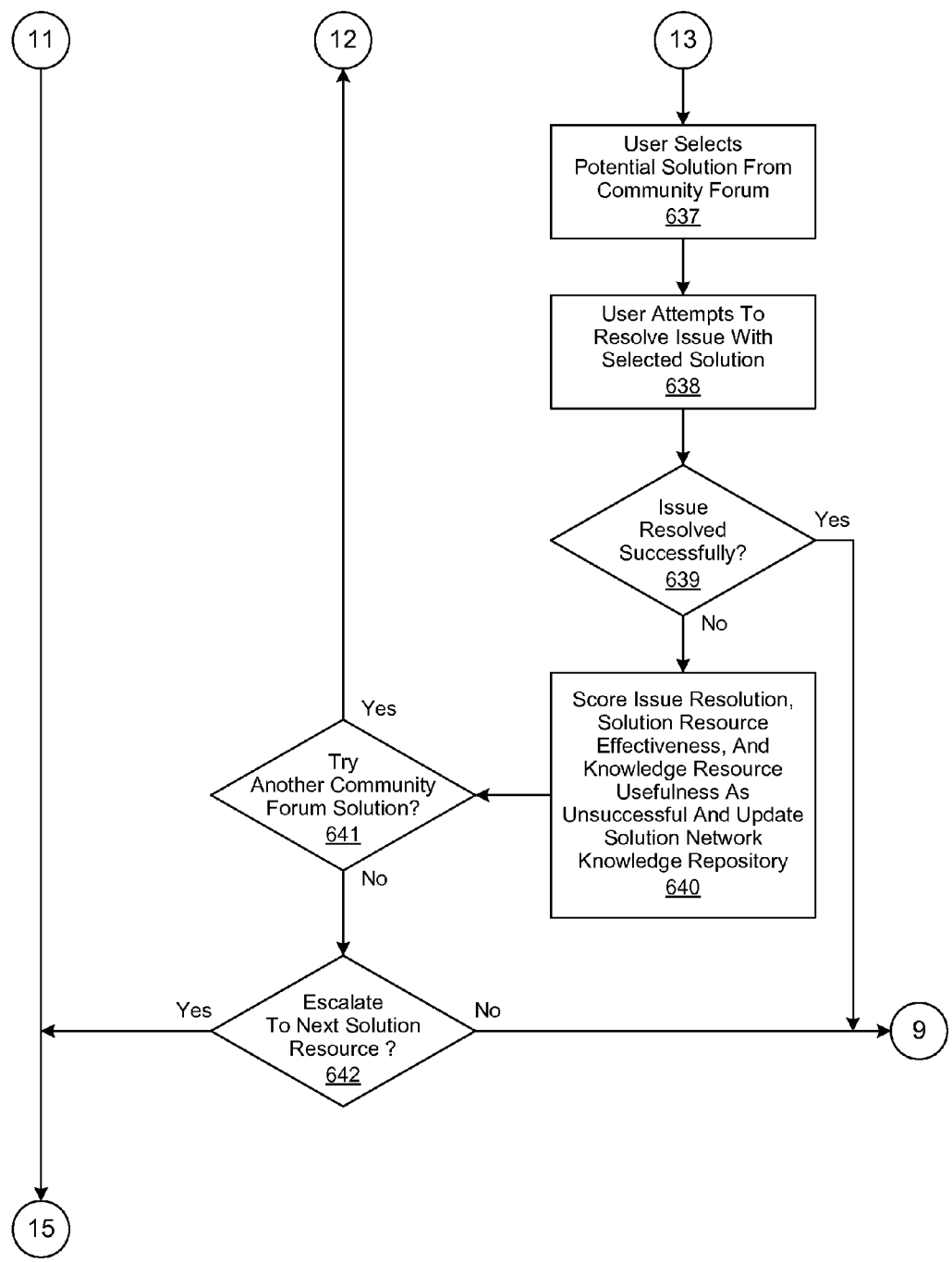
Figure 6G:
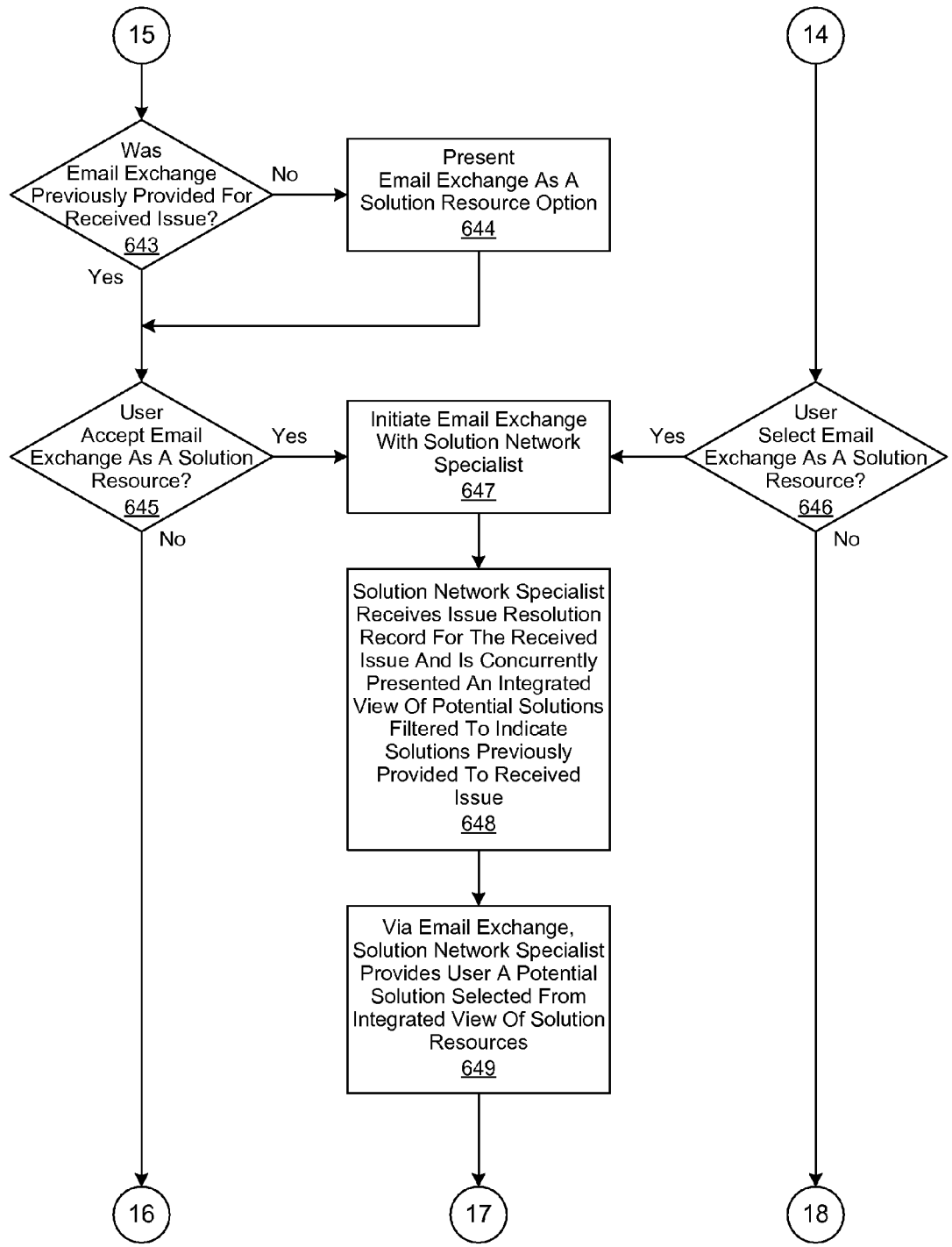
Figure 6H:
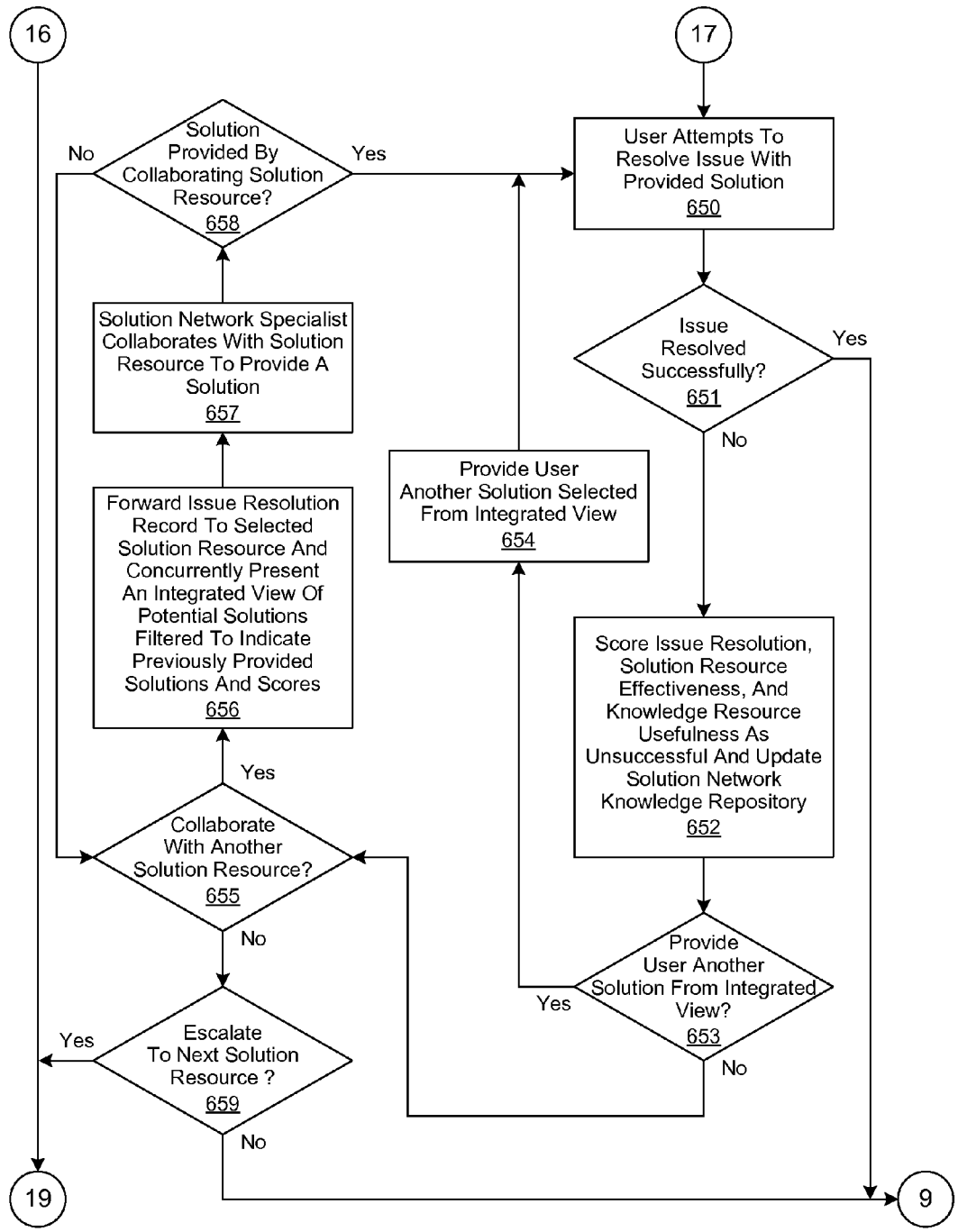
Figure 6I:
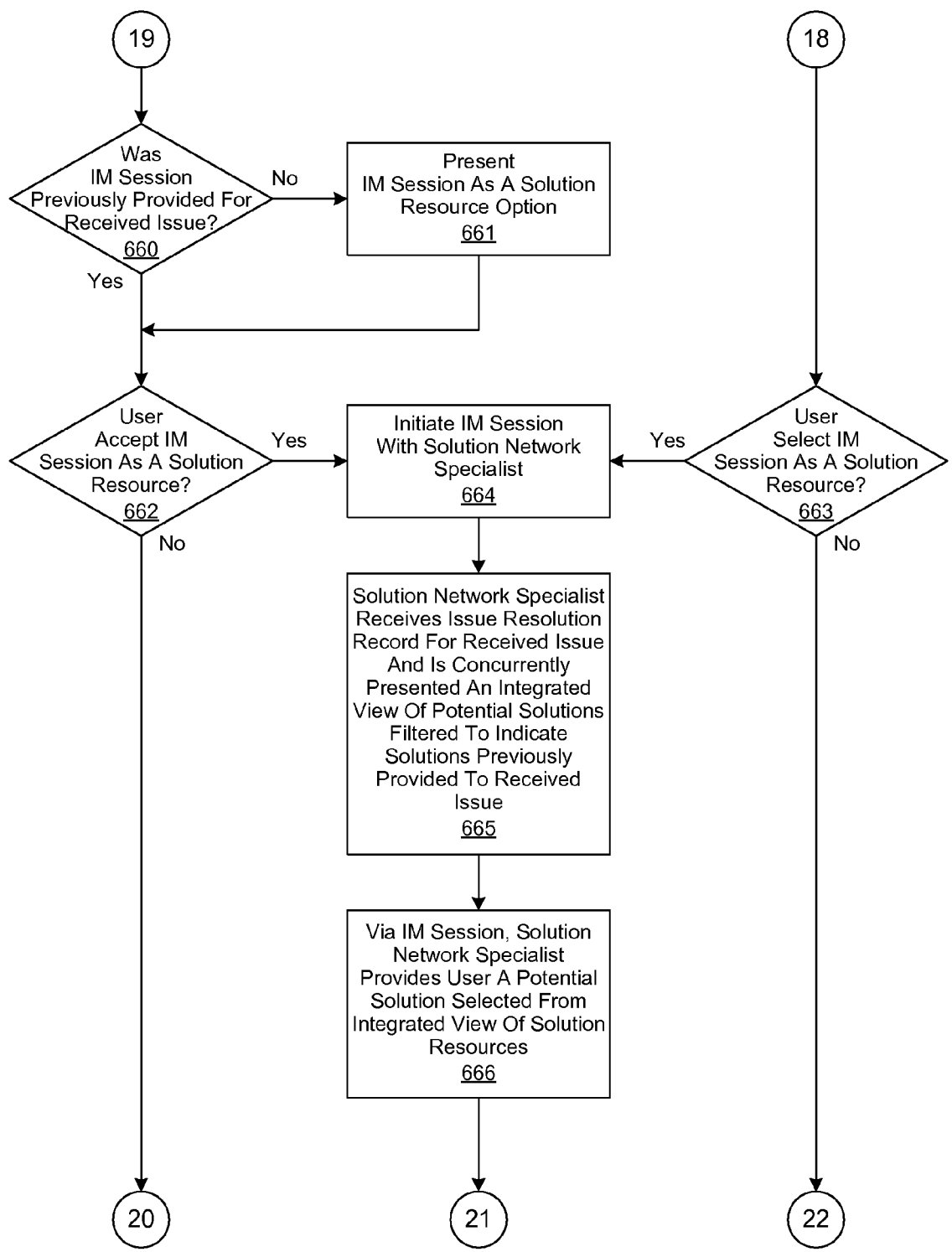
Figure 6J:
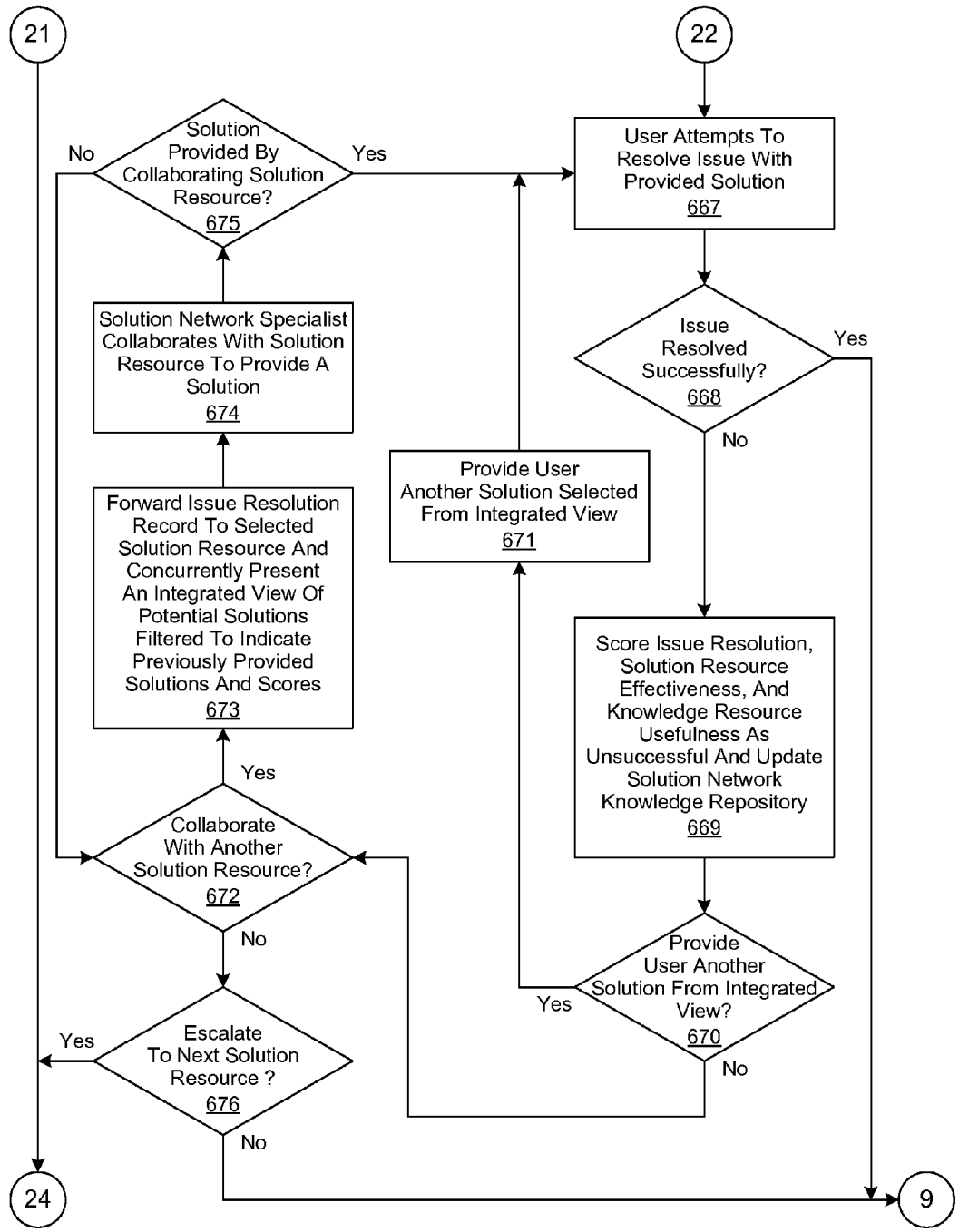
Figure 6K:
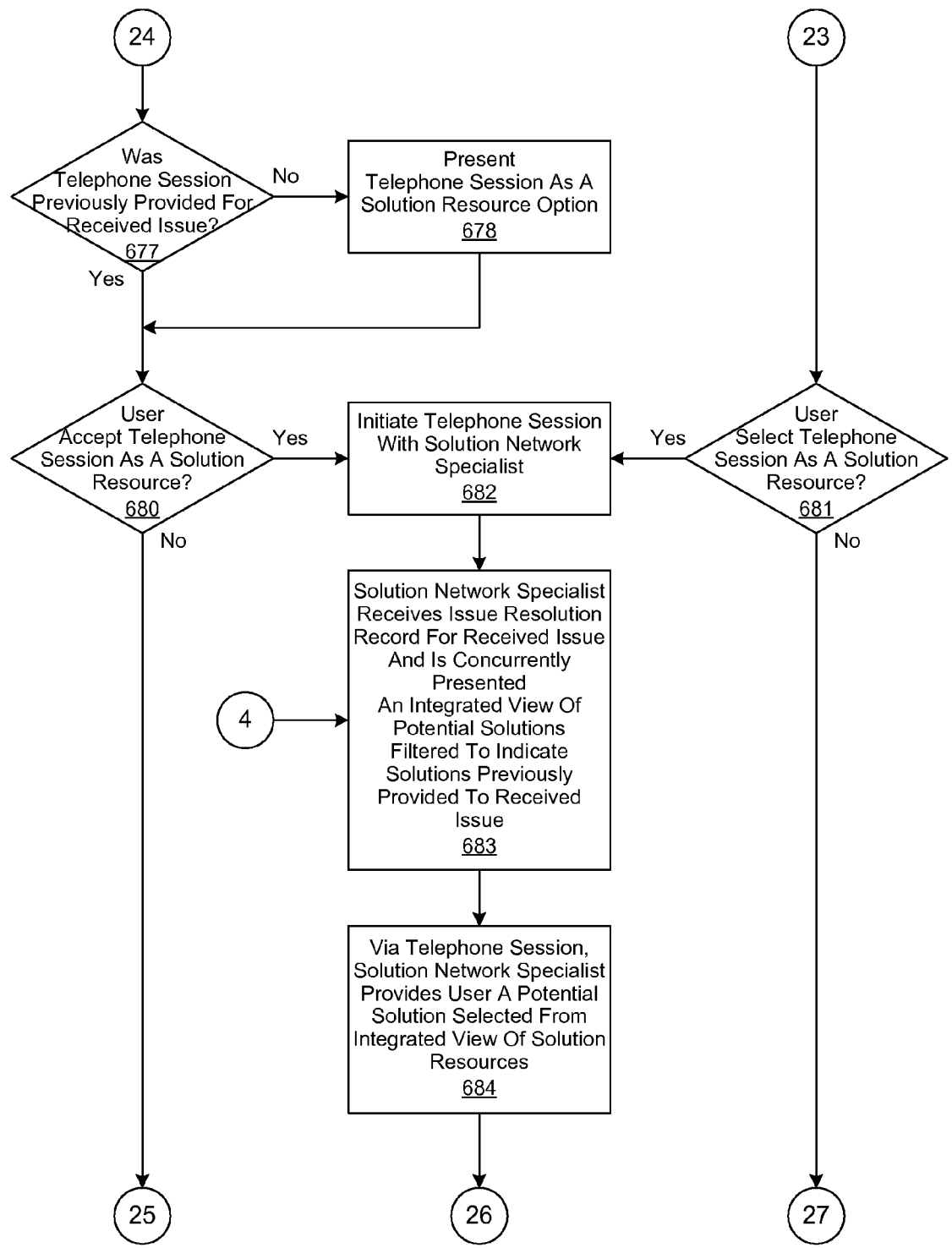
Figure 6I:
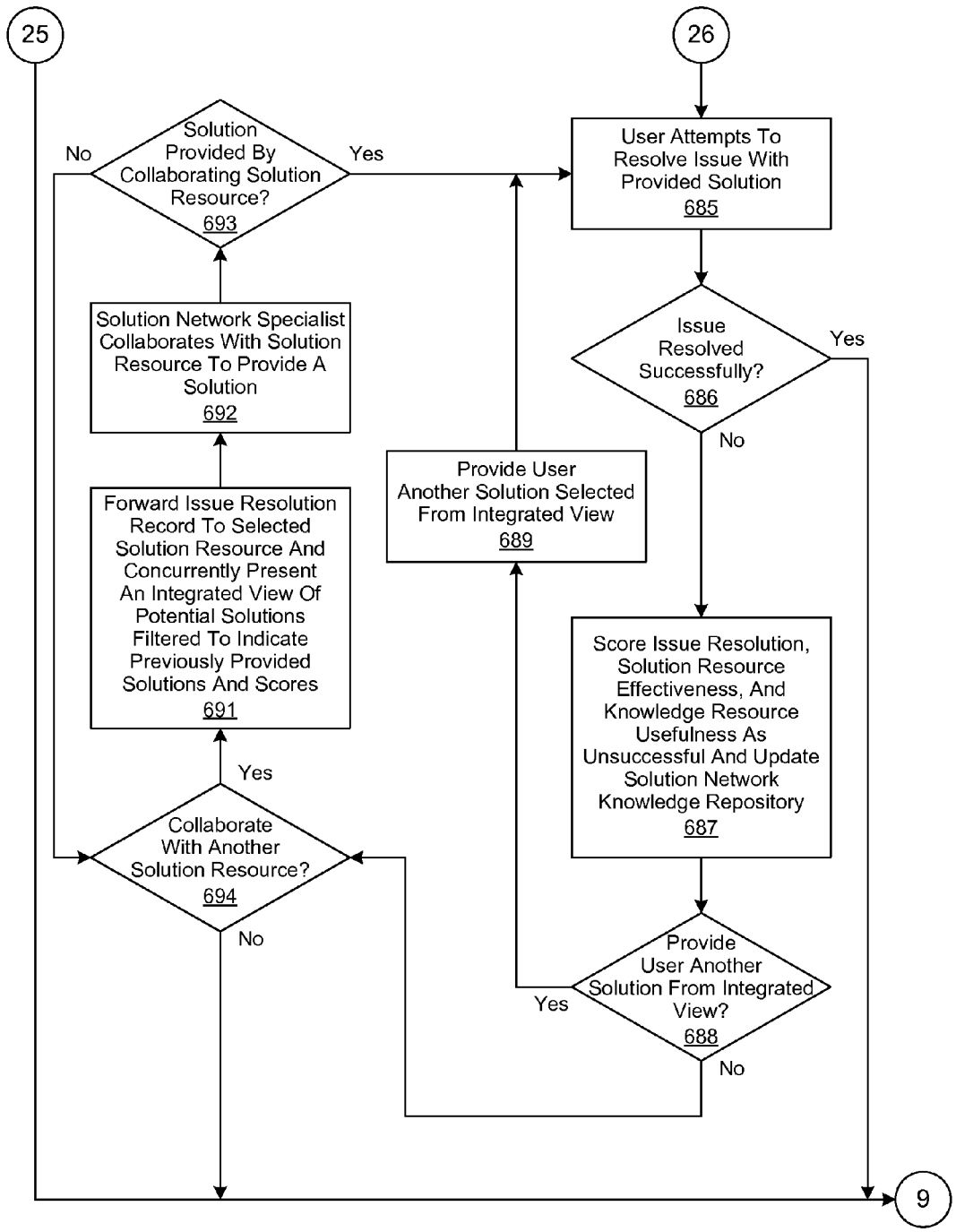
Figure 6M:
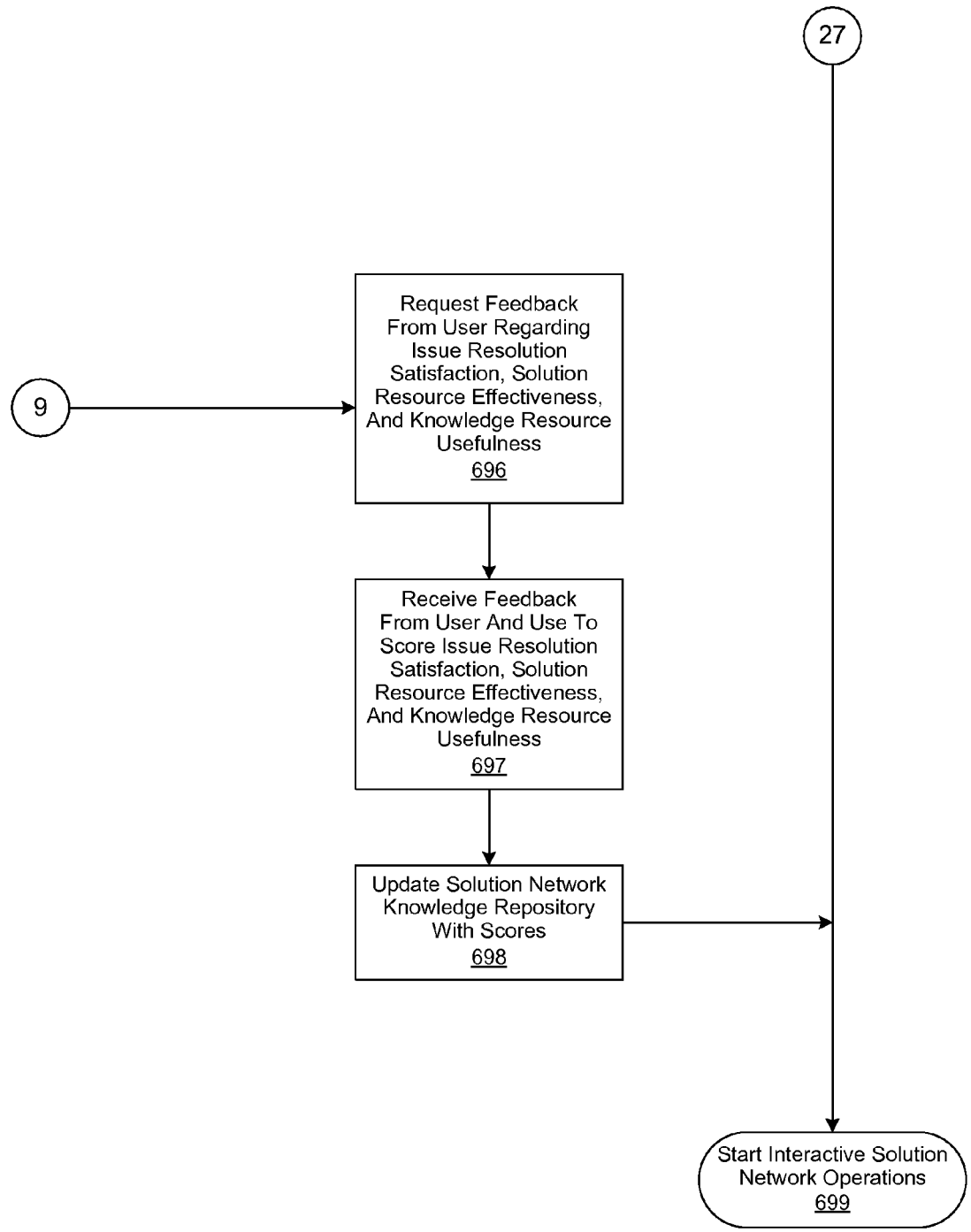

FIGS. 5*a*-*c* are a flowchart for providing potential on-the-box (OTB) solutions from within a solution network in response to the receipt of an issue. In an embodiment of the invention, OTB issue resolution operations for a solution network are begun in step 502, followed by a determination in step 502 whether an issue is identified by a user or an OTB monitor of the user's system. As an example, a user may be unable to play a digital versatile disk (DVD) on their system, and as a result, identify an issue. As another example, an OTB monitor running on their system may detect the failure of the system's DVD drive and alert the user before the user tries to play a DVD in the failed drive. If it is determined in step 504 that the issue is identified by an OTB monitor, then the monitor alerts the user that an issue exists in step 504.

A determination is then made in step 506 whether to run OTB diagnostics in an attempt to resolve the identified issue. If not, the user is provided instructions in step 540 to contact the solution network, followed by the user contacting the solution network in step 542 and submitting the issue, user information and system information. A determination is then made in step 544 whether the solution network has previously provided a solution for the submitted issue. If so, then feedback is requested from the user in step 546 regarding the effectiveness of the provided solution and the user's satisfaction rating in the resolution of the submitted issue. The user's feedback is received in step 548 and then used in step 550 to score the success of the solution network in resolving the issue and the corresponding effectiveness of the solution resource(s) providing the solution. Once scoring is completed, the solution network knowledge repository is updated with the scores in step 552. Once the updating of the solution network knowledge repository is completed in step 552, or if it was determined in step 544 that no solution was provided by the solution network, OTB issue resolution operations are ended in step 554.

Otherwise, OTB diagnostics are run on the user's system in step 510 to generate a potential remedial action. A determination is then made in step 512 whether a remedial action was generated by the system's OTB diagnostics. If not, the process continues, proceeding to step 540 as described in greater detail hereinabove. Otherwise, a determination is made in step 514 whether the potential remedial action generated by the OTB diagnostics in step 510 can be performed on the system. If so, then the remedial action is performed on the system in step 516. A determination is then made in step 518 to determine if the remedial action was successful. If so, then feedback is requested from the user in step 546 regarding the effectiveness of the provided solution and the user's satisfaction rating in the resolution of the submitted issue. The user's feedback is received in step 548 and then used in step 550 to score the success of the solution network in resolving the issue and the corresponding effectiveness of the solution resource(s) providing the solution. Once scoring is completed, the solution network knowledge repository is updated with the scores in step 552. Once the updating of the solution network knowledge repository is completed in step 552, or if it was determined in step 544 that no solution was provided by the solution network, OTB issue resolution operations are ended in step 554.

However, if it is determined in step 514 that the remedial action cannot be performed, or in step 518 that the performed remedial action was unsuccessful, then a determination is made in step 520 to see if updated OTB diagnostics or other software is available. If not, the process continues, proceeding to step 540 as described in greater detail hereinabove. Otherwise, a determination is made in step 526 whether network access to the solution network is available. If not, the process continues, proceeding to step 540 as described in greater detail hereinabove. Otherwise, a network connection is established between the system and the solution network in step 528 and system information is then submitted. In various embodiments, system information includes system issue symptoms, system configuration information, system diagnostic information, system operating information, system service history information, and other system information required by the solution network.

The submitted system information is then analyzed in step 530 to determine current versions of OTB diagnostics and other software for the system. A determination is then made in step 532 whether the OTB diagnostics and other software installed on the system are the current versions. As an example, the system may have the latest version of the OTB diagnostics and the latest operating system patches, but not the latest driver for its DVD drive. As another example, the analysis may indicate that additional software, such as a third party DVD player application, has been provided as a potential solution for similar issues submitted by other users. In this example, the solution network provides the third party DVD player application as a potential solution and gives the user the option of installing it. If it is determined that the OTB diagnostics and other software installed on the system are the current versions, then the process continues, proceeding to step 540 as described in greater detail hereinabove. Otherwise, the current OTB diagnostics and other software are provided as a potential solution by the solution network in step 534, followed by their installation on the system in step 536. Once installed, the updated OTB diagnostics and other software are run in step 538 to generate a potential remedial action. The process then continues, proceeding with step 522. However, if it is determined in step 532 that the OTB diagnostics and other software installed on the system are the current versions then the process continues, proceeding to step 540 as described in greater detail hereinabove.

FIGS. 6a-m are a flowchart for interactively providing potential solutions from within a solution network in response to the receipt of an issue. In an embodiment of the invention, interactive solution network operations are begun in step 601, followed by a determination in step 602 whether network access to a solution network is available to a user's system. If so, then a determination is made in step 603 whether to connect the user to a user portal of the solution network. If so, then a network connection is established in step 604 between the user's system and the solution network and the user is provided access to a user portal. In step 605, system information and any on-the-box (OTB) diagnostics information associated with a system issue is submitted by the system to the user portal of the solution network. In various embodiments, system information includes system issue symptoms, system configuration information, system diagnostic information, system operating information, system service history information, and other system information required by the solution network. It will be appreciated that in various embodiments, OTB diagnostics information, when combined with user and system information, is operable to generate issue symptom information.

However, is it is determined in step 602 that network access to the solution network is not available, or if the user decides not to connect their system to the solution network in step 603, then the user places a telephone call to the solution network in step 606. Once connected via a telephone call, the user provides user information, system information, and issue symptoms to a solution network specialist. As used herein, a solution network specialist is any entity operable to either act as a solution resource, access other solution resources, or collaborate with other solution resources, to provide a potential solution to an issue. The information generated in step 605, or the information provided in step 607, is then used to retrieve additional user information, system information, and issue resolution history from the solution network knowledge repository in step 608. In various embodiments, the user information is linked to the solution network and is operable to generate knowledge for the solution network and to tailor user-specific solutions. In these embodiments, the user information includes system order information, system purchase information, system configuration information, user configuration information, previously provided solutions, historical issue resolution information, and historical solution resources providing the resolution information.

Once retrieved, the additional user information, system information, and issue resolution history is analyzed in step 609. As a result of the analysis, potential solutions to the received issue are determined in step 610. A determination is then made in step 611 whether a solution has previously been provided to the received issue. If not, then a new issue resolution record is generated and then auto-populated with the user information, system information, and issue resolution history in step 612. Otherwise, the potential solutions determined in step 610 are filtered in step 613 to indicate which solutions were previously provided, by which solution resource(s), then cross-referenced to the issue resolution history, all of which is then auto-populated in a new issue resolution record. Once the new issue resolution record has been respectively auto-populated in either step 612 or 613, an integrated view of potential internal and external solution resources is generated in step 614. In various embodiments, the integrated view is respectively ordered by issue resolution, solution resource effectiveness, and knowledge resource usefulness scores.

A determination is then made in step 615 whether the received issue was submitted via the user's system connecting to the solution network or the user via telephone. If the received issue was submitted via the user's system, then a determination is made in step 616 whether the user elects to be auto-routed by the solution network to a predetermined solution resource, or elects to select a preferred solution resource. If the user elects to be auto-routed by the solution network, then a determination is made in step 617 whether a self-help module was previously provided as a potential solution for the received issue. If not, then a self-help module is presented to the user as a solution resource option in step 618. Otherwise, or if the self-help module is presented to the user as an option in step 618, a determination is made in step 619 whether the user elects to accept the self-help module as a solution resource.

However, if the user elects to select a preferred solution resource in step 616, then the new issue record, and the filtered, integrated view of available solution resources are presented to the user in step 620. The user then selects a preferred solution resource from the integrated view in step 621, followed by a determination in step 622 whether the selected solution resource is a self-help module. If so, or if the user elects to accept the self-help module in step 619, then the user is routed to the self-help module in step 623. Solutions in the self-help module are then filtered in step 624 to indicate which of the solutions have been previously provided to the received issue. In step 625, the user selects a potential solution from the self-help module, followed by attempting to resolve the received issue with the selected solution in step 626.

A determination is then made in step 627 whether the selected solution successfully resolved the issue. If not, then issue resolution satisfaction, solution resource effectiveness, and knowledge resource usefulness is scored as unsuccessful in step 628 and the solution network repository is updated accordingly. A determination is then made in step 629 whether to try another self-help module solution. If so, the process continues, proceeding with step 624. Otherwise, a determination is made in step 630 whether to escalate the issue to the next solution resource to provide a potential solution. If not, or if it is determined in step 627 that the issue was successfully resolved, then feedback is requested from the user in step 696 regarding the effectiveness of the provided solution and the user's satisfaction rating in having the issue resolved. The feedback is received by the solution network in step 697 and used to score the issue resolution satisfaction, solution resource effectiveness, and knowledge resource usefulness. The solution network knowledge repository is then updated with the scores in step 698. Interactive solution network operations are then ended in step 699.

However, if it is determined in step 630 to escalate the received issue to the next solution resource, then a determination is made in step 631 whether a community forum was previously provided as a potential solution for the received issue. If not, then a community forum is presented to the user as a solution resource option in step 632. Otherwise, or if the self-help module is presented to the user as an option in step 632, a determination is made in step 633 whether the user elects to accept the community forum as a solution resource.

Likewise, if a self-help module was not selected by the user as a solution resource in step 622, a determination is made in step 634 whether the user selects a community forum as a solution resource. If so, or if the user elects to accept a community forum as a solution resource in step 633, then the user is routed to the community forum in step 635. Solutions in the community forum are then filtered in step 636 to indicate which of the solutions have been previously provided to the received issue. In step 637, the user selects a potential solution from the community forum, followed by attempting to resolve the issue with the selected solution in step 638.

A determination is then made in step 639 whether the selected solution successfully resolved the issue. If not, then issue resolution satisfaction, solution resource effectiveness, and knowledge resource usefulness is scored as unsuccessful in step 640 and the solution network repository is updated accordingly. A determination is then made in step 641 whether to try another community forum solution. If so, the process continues, proceeding with step 636. Otherwise, a determination is made in step 642 whether to escalate the issue to the next solution resource to provide a potential solution. If not, or if it is determined in step 639 that the issue was successfully resolved, then the process continues, proceeding to step 696 as described in greater detail hereinabove.

However, if it is determined in step 642 to escalate the received issue to the next solution resource, then a determination is made in step 643 whether an email exchange with a solution network specialist was previously provided as a potential solution for the received issue. If not, then an email exchange with a solution network specialist is presented to the user as a solution resource option in step 644. Otherwise, or if an email exchange with a solution network specialist is presented to the user as an option in step 643, a determination is made in step 645 whether the user elects to accept the community forum as a solution resource.

Likewise, if a community forum was not selected by the user as a solution resource in step 634, a determination is made in step 646 whether the user selects an email exchange with a solution network specialist as a solution resource. If so, or if the user elects to accept an email exchange with a solution network specialist as a solution resource in step 645, then an email exchange with a solution network specialist is initiated in step 647. The solution network specialist then receives an issue resolution record for the received issue in step 648. Concurrently, the solution network specialist is presented an integrated view of potential solutions that has been filtered to indicate which of the solutions have been previously provided to the received issue. In step 649, via email, the network solution specialist provides the user a potential solution selected the integrated view of potential solution. The user then attempts to resolve the issue with the provided solution in step 650.

A determination is then made in step 651 whether the selected solution successfully resolved the issue. If not, then issue resolution satisfaction, solution resource effectiveness, and knowledge resource usefulness is scored as unsuccessful in step 652 and the solution network repository is updated accordingly. A determination is then made in step 641 by the network solution specialist whether to provide the user another solution from the integrated view. If so, then the network solution specialist selects another solution from the integrated view and provides it to the user in step 654. The process then continues, proceeding with step 650.

Otherwise, a determination is made in step 655 whether to collaborate with another solution resource provided by the solution network. If so, the issue resolution record is forwarded in step 656 to a solution resource selected from the integrated view by the solution network specialist. Concurrently, the selected solution resource is presented an integrated view of potential solutions that has been filtered to indicate which of the solutions have been previously provided to the received issue. It will be apparent to those of skill in the art that the filtered, integrated view will now indicate that the solution that was previously provided is now indicated to be unsuccessful. The solution network specialist then collaborates with the selected solution resource in step 657 to provide a solution to the received issue. A determination is then made in step 658 whether a solution is provided by collaborating with the solution resource. If so, the process continues, proceeding with step 650. Otherwise, the process continues, proceeding with step 655. However, if it is determined in step 655 to not collaborate with another solution resource, a determination is made in step 659 whether to escalate the issue to the next solution resource to provide a potential solution. If not, or if it is determined in step 651 that the issue was successfully resolved, then the process continues, proceeding to step 696 as described in greater detail hereinabove.

However, if it is determined in step 659 to escalate the received issue to the next solution resource, then a determination is made in step 660 whether an instant messaging (IM) session with a solution network specialist was previously provided as a potential solution for the received issue. If not, then an IM session with a solution network specialist is presented to the user as a solution resource option in step 661. Otherwise, or if an IM session with a solution network specialist is presented to the user as an option in step 660, a determination is made in step 662 whether the user elects to accept an IM session with a solution network specialist as a solution resource.

Likewise, if an email exchange with a solution network specialist was not selected by the user as a solution resource in step 646, a determination is made in step 663 whether the user selects an IM session with a solution network specialist as a solution resource. If so, or if the user elects to accept an IM session with a solution network specialist as a solution resource in step 662, then an IM session with a solution network specialist is initiated in step 664. The solution network specialist then receives an issue resolution record for the received issue in step 665. Concurrently, the solution network specialist is presented an integrated view of potential solutions that has been filtered to indicate which of the solutions have been previously provided to the received issue. In step 649, via the IM session and other methods familiar to those of skill in the art, the network solution specialist provides the user a potential solution selected the integrated view of potential solution. The user then attempts to resolve the issue with the provided solution in step 667.

A determination is then made in step 668 whether the selected solution successfully resolved the issue. If not, then issue resolution satisfaction, solution resource effectiveness, and knowledge resource usefulness is scored as unsuccessful in step 669 and the solution network repository is updated accordingly. A determination is then made in step 670 by the network solution specialist whether to provide the user another solution from the integrated view. If so, then the network solution specialist selects another solution from the integrated view and provides it to the user in step 671. The process then continues, proceeding with step 668.

Otherwise, a determination is made in step 672 whether to collaborate with another solution resource provided by the solution network. If so, the issue resolution record is forwarded in step 673 to a solution resource selected from the integrated view by the solution network specialist. Concurrently, the selected solution resource is presented an integrated view of potential solutions that has been filtered to indicate which of the solutions have been previously provided to the received issue. The solution network specialist then collaborates with the selected solution resource in step 674 to provide a solution to the received issue. A determination is then made in step 675 whether a solution is provided by collaborating with the solution resource. If so, the process continues, proceeding with step 667. Otherwise, the process continues, proceeding with step 672. However, if it is determined in step 672 to not collaborate with another solution resource, a determination is made in step 676 whether to escalate the issue to the next solution resource to provide a potential solution. If not, or if it is determined in step 668 that the issue was successfully resolved, then the process continues, proceeding to step 696 as described in greater detail hereinabove.

However, if it is determined in step 676 to escalate the received issue to the next solution resource, then a determination is made in step 677 whether a telephone session with a solution network specialist was previously provided as a potential solution for the received issue. If not, then a telephone session with a solution network specialist is presented to the user as a solution resource option in step 678. Otherwise, or if a telephone session with a solution network specialist is presented to the user as an option in step 677, a determination is made in step 680 whether the user elects to accept a telephone session with a solution network specialist as a solution resource.

Likewise, if an instant messaging (IM) exchange with a solution network specialist was not selected by the user as a solution resource in step 663, a determination is made in step 681 whether the user selects a telephone session with a solution network specialist as a solution resource. If so, or if the user elects to accept a telephone session with a solution network specialist as a solution resource in step 680, then a telephone session with a solution network specialist is initiated in step 682. Then, or if it was determined in step 615 that the issue was originally submitted via a telephone call by the user, the solution network specialist receives an issue resolution record for the received issue in step 683. Concurrently, the solution network specialist is presented an integrated view of potential solutions that has been filtered to indicate which of the solutions have been previously provided to the received issue. In step 684, via the telephone session and other methods familiar to those of skill in the art, the network solution specialist provides the user a potential solution selected the integrated view of potential solution. The user then attempts to resolve the issue with the provided solution in step 685.

A determination is then made in step 686 whether the selected solution successfully resolved the issue. If not, then issue resolution satisfaction, solution resource effectiveness, and knowledge resource usefulness is scored as unsuccessful in step 687 and the solution network repository is updated accordingly. A determination is then made in step 688 by the network solution specialist whether to provide the user another solution from the integrated view. If so, then the network solution specialist selects another solution from the integrated view and provides it to the user in step 689. The process then continues, proceeding with step 685.

Otherwise, a determination is made in step 694 whether to collaborate with another solution resource provided by the solution network. If so, the issue resolution record is forwarded in step 691 to a solution resource selected from the integrated view by the solution network specialist. Concurrently, the selected solution resource is presented an integrated view of potential solutions that has been filtered to indicate which of the solutions have been previously provided to the received issue. The solution network specialist then collaborates with the selected solution resource in step 692 to provide a solution to the received issue. A determination is then made in step 693 whether a solution is provided by collaborating with the solution resource. If so, the process continues, proceeding with step 685. Otherwise, the process continues, proceeding with step 694. However, if it is determined in step 694 to not collaborate with another solution resource, or if it is determined in step 668 that the issue was successfully resolved, then feedback is requested from the user in step 696 regarding the effectiveness of the provided solution and the user's satisfaction rating in having the issue resolved. The feedback is received by the solution network in step 697 and used to score the issue resolution satisfaction, solution resource effectiveness, and knowledge resource usefulness. The solution network knowledge repository is then updated with the scores in step 698. Interactive solution network operations are then ended in step 699.

Figure 7A:
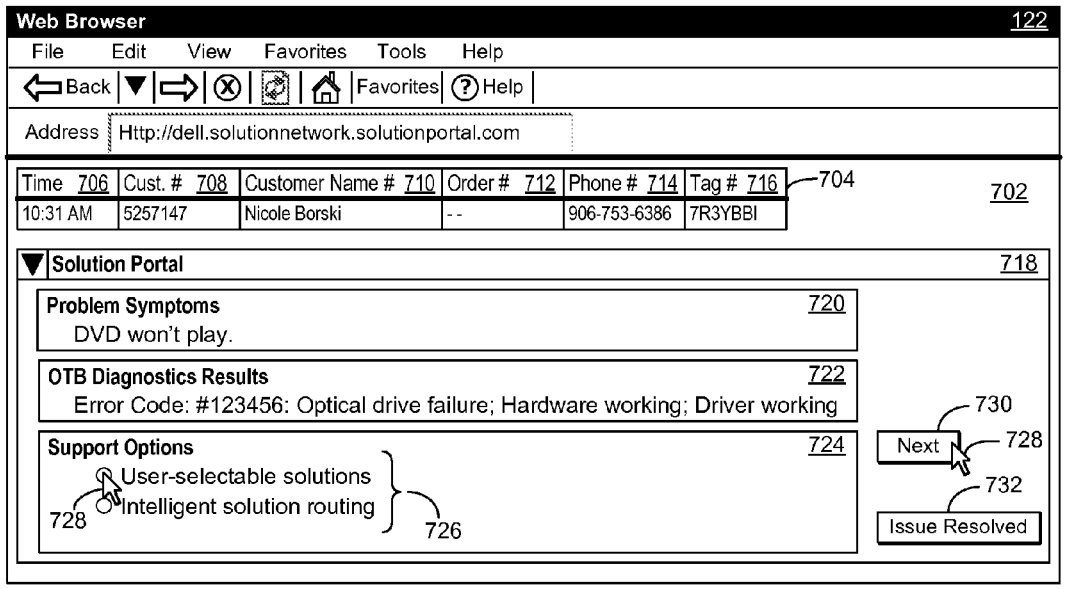
FIGS. 7a-d show the integration of solution resources in a solution network as presented to a user within a graphical user interface (GUI)

FIGS. 7a-d show the integration of solution resources in a solution network as presented to a user within a graphical user interface (GUI) as implemented in accordance with an embodiment of the invention. As shown in FIG. 7a, a Web browser 122 comprises a GUI 702 to a user portal of a solution network. In various embodiments, the GUI 702 comprises an issue resolution record summary 704 further comprising system and user information. The system and user information comprises the time 706 the issue was received by the solution network, the user's customer number 708 and name 710, an order number 712 if applicable, the user's phone number 714, and a unique system identifier 716. The GUI 702 also comprises a Solution Portal window 718, which further comprises a Problem Symptoms field 720, an On-The-Box (OTB) Diagnostics Results field 722, and a Support Options menu 724.

In this embodiment, the user establishes a network connection between their system and the solution network. Once the connection is established, the user accesses the solution portal with the browser 122. In one embodiment, user information, system information and any on-the-box (OTB) diagnostics information associated with a system issue is automatically submitted by the system to the user portal of the solution network. Once submitted, the information is used to auto-populate the issue resolution record summary 704, the Problem Symptoms field 720, and the OTB Diagnostics Results field 722.

In one embodiment, the submitted information is used to retrieve additional user information and system information from the solution network knowledge repository. In various embodiments, the user information includes system order information, system purchase information, system configuration information, user configuration information, previously provided solutions, historical issue resolution information, and historical solution resources providing the resolution information. In these embodiments, system information includes system issue symptoms, system configuration information, system diagnostic information, system operating information, system service history information, and other system information required by the solution network. It will be appreciated that in various embodiments, OTB diagnostics information, when combined with user and system information, is operable to generate issue symptom information. In these various embodiments, this retrieved information, along with the submitted information, is analyzed to determine potential solutions for the received issue.

It will be apparent to those of skill in the art that there are many ways the symptoms describing a user's issue may be entered into the Solution Portal 718. For example, in one embodiment, the user is guided by business rules in describing the symptoms. In another embodiment, the user is guided by a wizard. In yet another embodiment, the symptoms are selected from a plurality of symptoms presented to the user. In still another embodiment, the plurality of symptoms presented to the user in a tree format that allows the user to navigate through symptoms one at a time, picking and choosing particular symptoms that match their issue.

In various embodiments, the user manually enters symptoms of their issue in the Problem Symptoms window 720. In one embodiment, the provided symptoms comprise search words that are operable to be used in a search for potential solutions. In another embodiment, the search words comprise natural language. In yet another embodiment, the natural language search words are used to perform a natural language search query.

In one embodiment, the user is provided a choice of support options 726. In one embodiment, the user elects to select a preferred solution resource from a plurality of solution resources presented by the solution network based on analysis of the user and system information provided by the user and retrieved from the solution network knowledge repository. In another embodiment, the user elects to be auto-routed by the solution network to a preferred solution resource based on analysis of the user and system information provided by the user and retrieved from the solution network knowledge repository. The user elects their preference through a user gesture, such as a mouse-click with cursor 728 on the support options 726. Once the support option 726 is selected, the user proceeds in the issue resolution process by selecting the Next command button 730 through a user gesture, such as a mouse-click with cursor 728. Likewise, once the issue is resolved, the user selects the Issue Resolved command button 732 through a similar user gesture, such as a mouse-click with cursor 728.

Figure 7B:
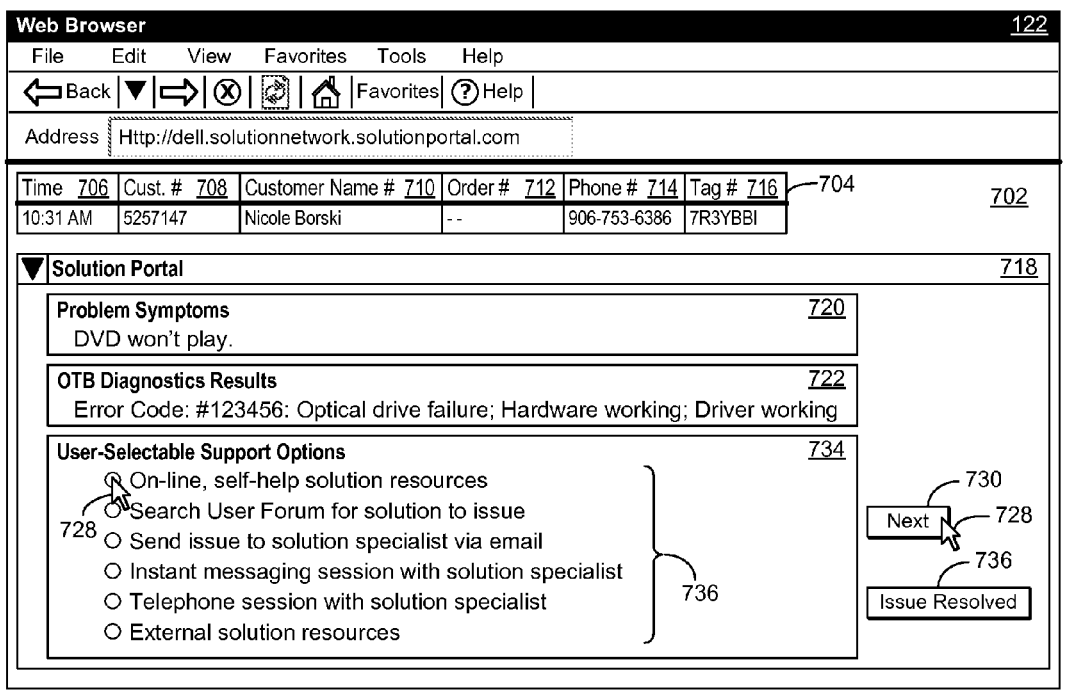

Referring now to FIG. 7b, a User-Selectable Support Options menu 734 has now appeared within the Solution Portal window 718, displaying solution resources 736 available to the user. The user selects their preferred solution resource (e.g., "on-line, self-help") from the solution resources 736 through a user gesture, such as a mouse-click with cursor 728. The user then proceeds in the issue resolution process by selecting the Next command button 730 through a similar user gesture, such as a mouse-click with cursor 728.

Figure 7C:
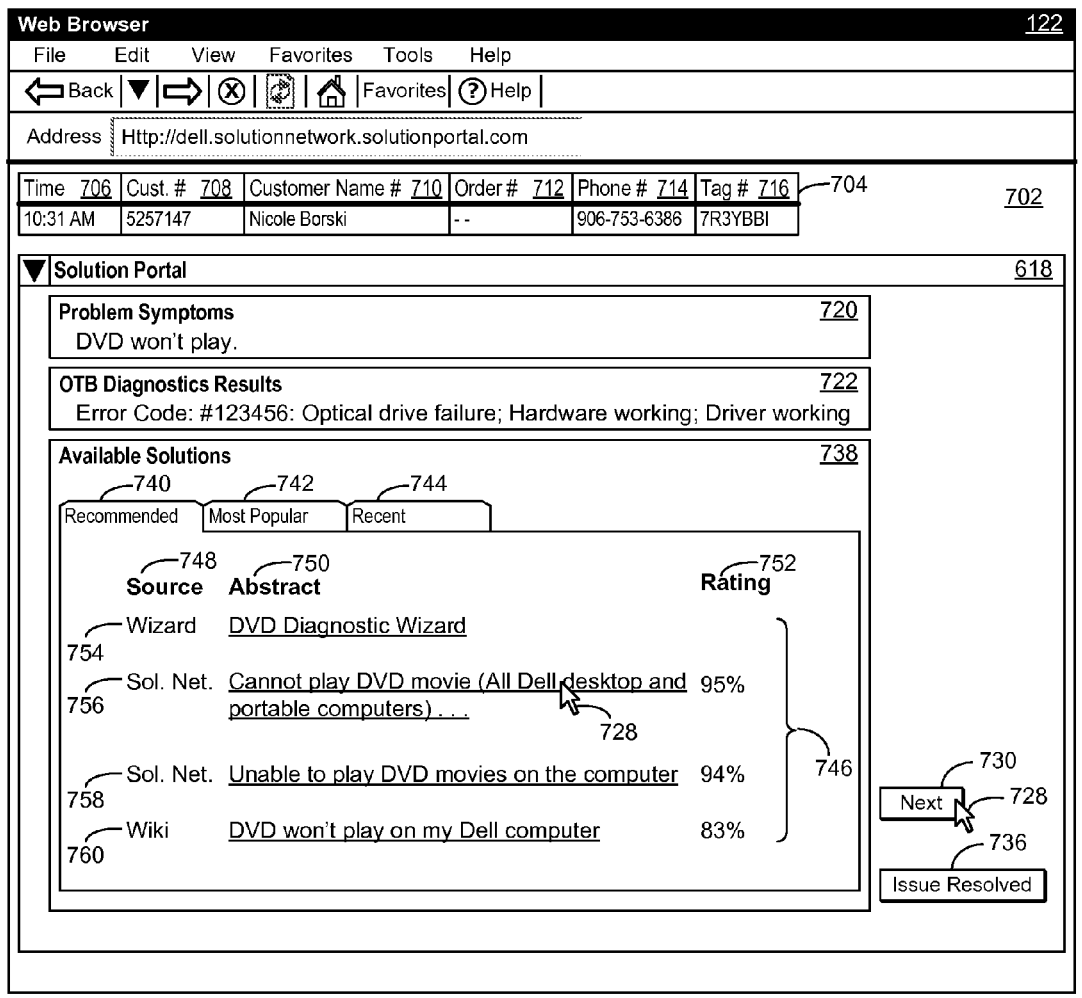

Referring now to FIG. 7c, an Available Solutions window 738 is displayed in response to the user selecting "on-line, self-help" from the solution resources 736 as their preferred solution resource. As shown in FIG. 7c, the Available Solutions window 738 comprises tabbed windows for Recommended 740, Most Popular 742, and Recent 744 potential solutions. The tabbed Recommended Solutions window 740 comprises a list of potential solutions 746, each of which has an originating source 748, an abstract 750, and a rating 752. In various embodiments, the plurality of potential solutions 746 is ranked based on its associated rating 752, with a higher rating indicating a more successful solution. As an example, the first 754 potential solution is indicated to have an originating source 748 of "Wizard" with its abstract 750 further indicating that it is a DVD diagnostic wizard. While the first 754 potential solution does not have a rating 752, its placement at the top of the list of potential solutions 746 indicates that it should be given precedence in resolving the issue displayed in the Problem Symptoms window 720. Likewise, the second 756 and third 758 potential solutions are indicated to have an originating source of "solution network". Their respective ratings of 95% and 94% place them as the most successful of the displayed solutions in resolving issues having the same or similar symptoms as those displayed in the Problem Symptoms window 720. The fourth 760 potential solution is indicated to have an originating source of "Wiki", further indicating that the source of the potential solution is external to, but accessible through, the solution network. As shown in FIG. 7c, the user selects potential solution 756 through a user gesture, such as a mouse-click with cursor 728. The user then proceeds in the issue resolution process by selecting the Next command button 730 through a similar user gesture, such as a mouse-click with cursor 728.

Figure 7D:
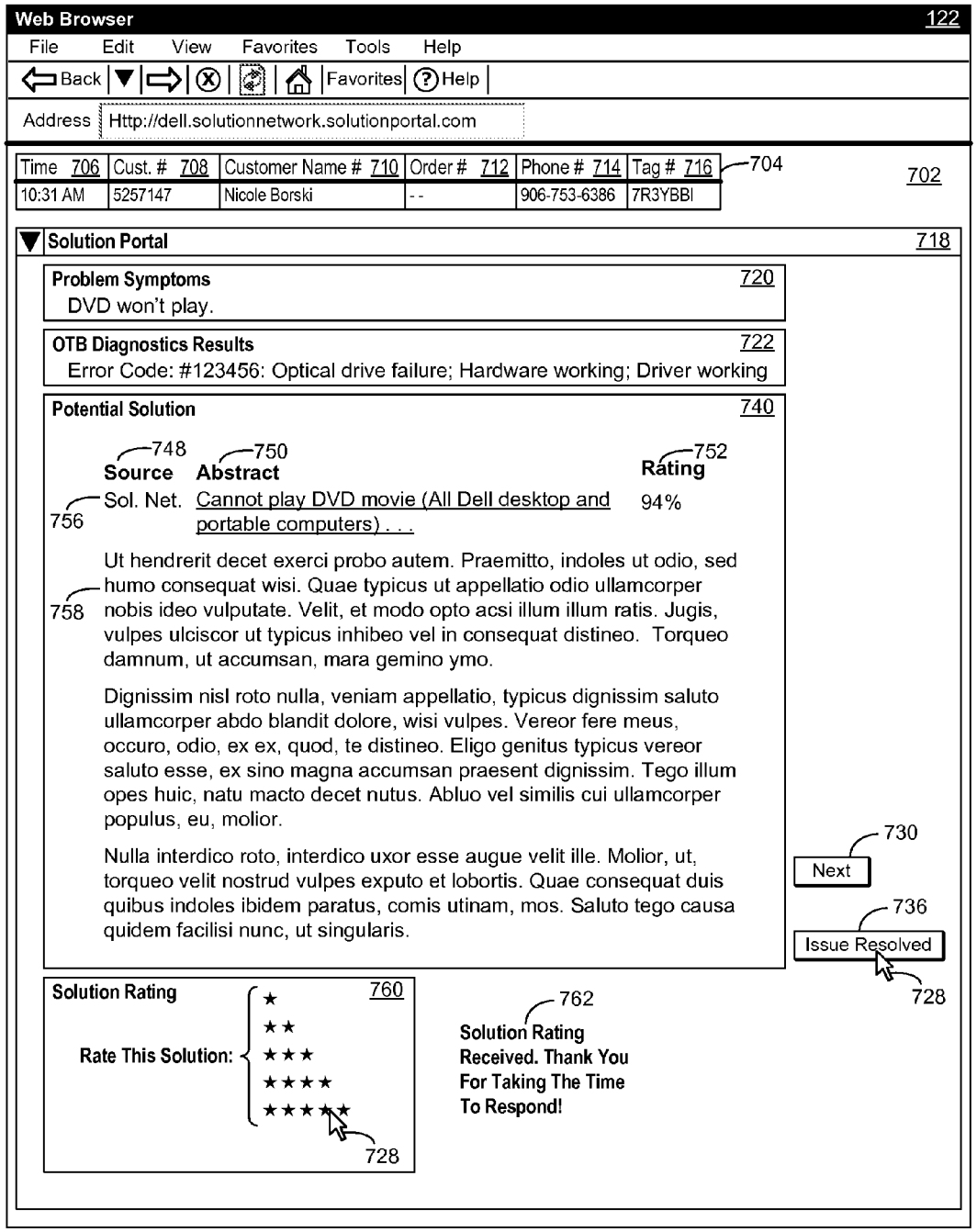

As a result, details of the potential solution 756 selected by the user are displayed in the Potential Solution window 740 as shown in FIG. 7d. The Potential Solution window 740 comprises the originating source 748, an abstract 750, and a rating 752 of potential solution 756, as well as instructive text 758 detailing the specifics of the solution. The user then performs the specifics of the instructive text 758, and if the provided solution is successful, selects the Issue Resolved command button 728 through a user gesture, such as a mouse-click of cursor 728.

As a result of the user selecting the Issue Resolved command button 728, a Solution Rating window 760 is displayed along with a request 762 asking the user to rate the effectiveness of the solution. The user then selects, through a user gesture such as a mouse click with cursor 728, a rating within the Solution Rating window 760 to indicate the success of the provided solution in resolving the issue. The selected rating is then indexed to the provided solution and incorporated into its associated Rating 752 for use as described in greater detail herein.

Figure 8A:
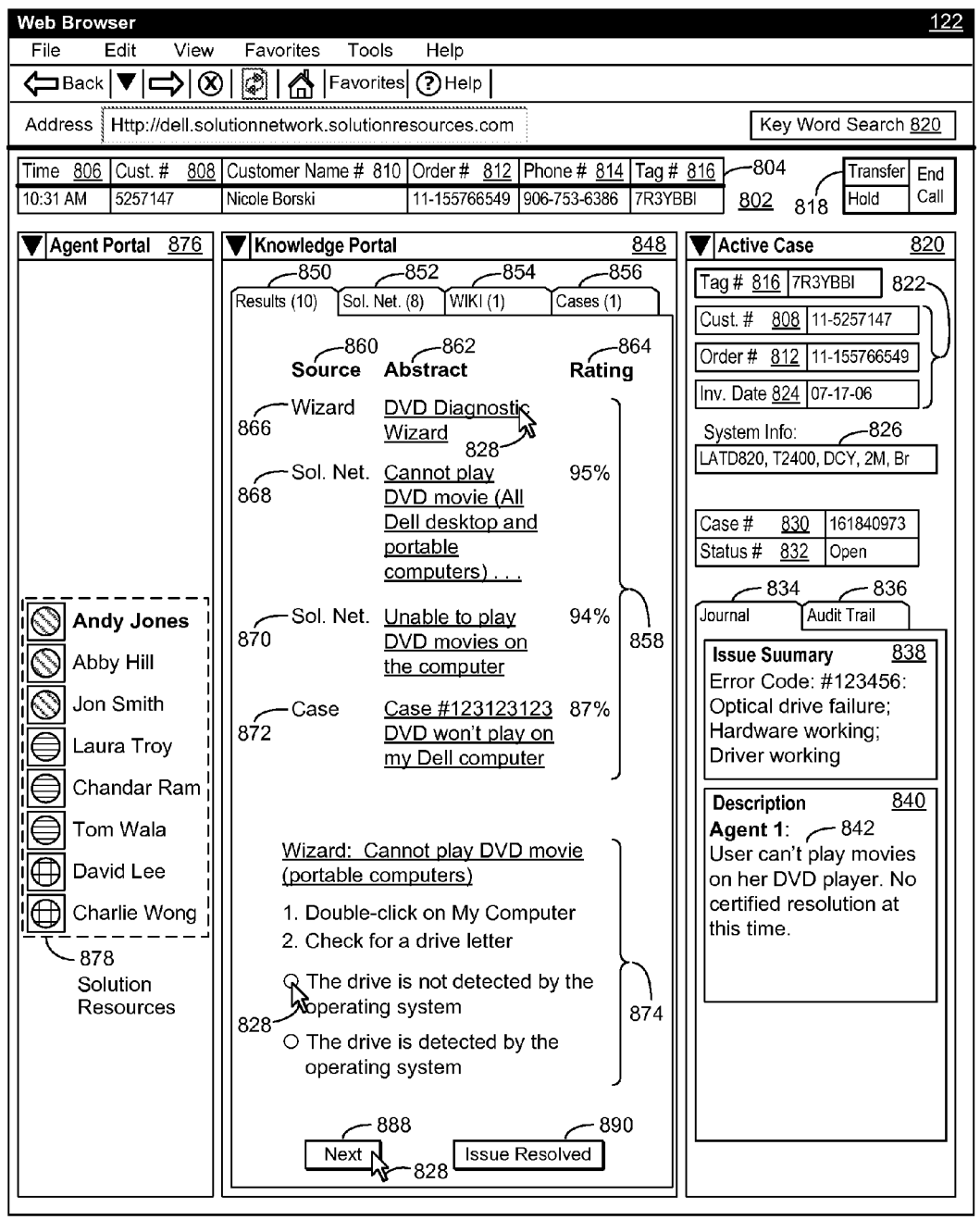
FIGS. 8a-b show the integration of solution resources in a solution network as presented to a network solution specialist within a graphical user interface (GUI).
Figure 8B:
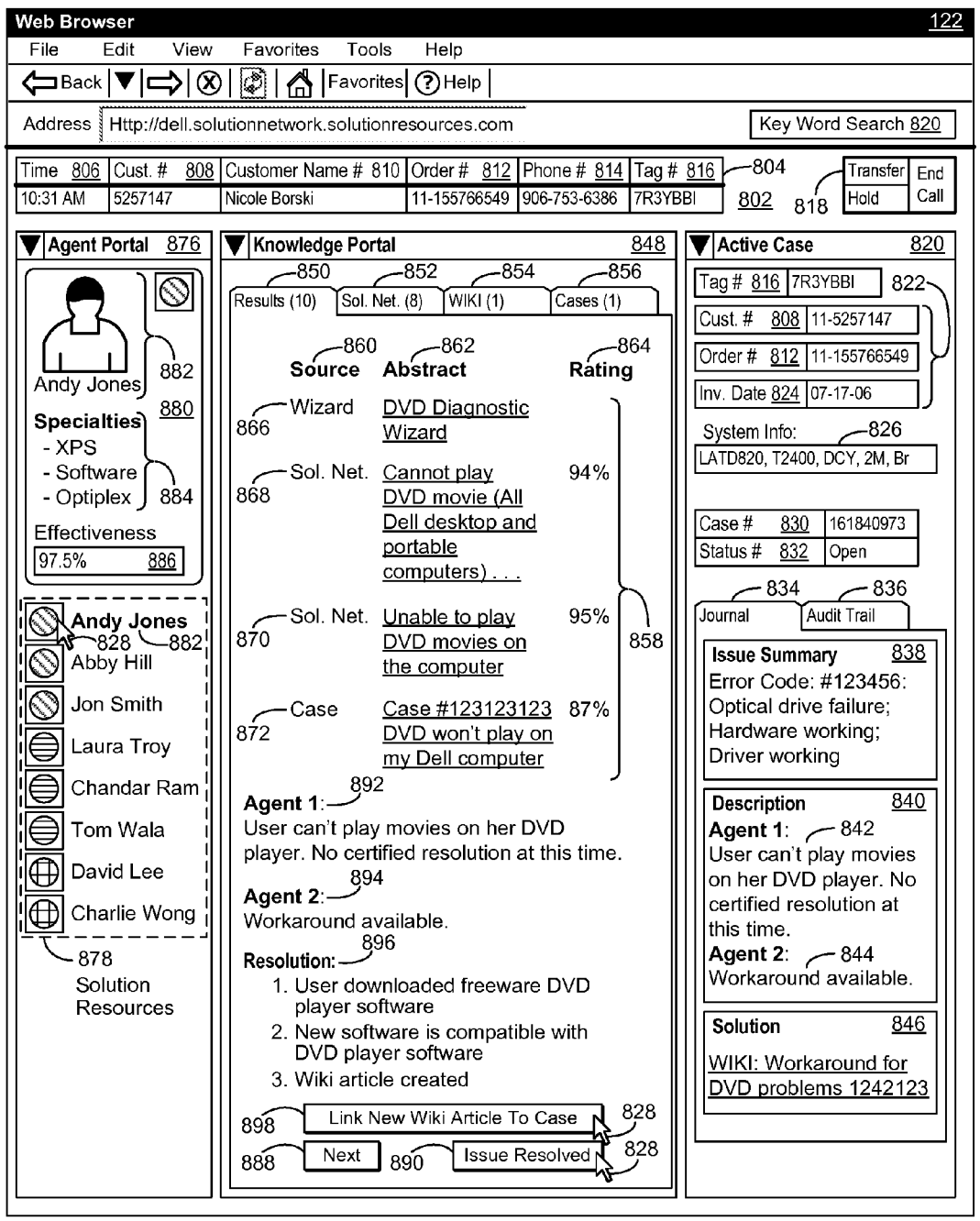

FIGS. 8*a-b* show the integration of solution resources in a solution network as presented to a network solution specialist within a graphical user interface (GUI) as implemented in accordance with an embodiment of the invention. As shown in FIG. 8*a*, a Web browser 122 comprises a GUI 802 that provides a network solution specialist an integrated view of a received issue and a plurality of solution resources available through a solution network. In various embodiments, the GUI 802 comprises an Issue Resolution Record Summary 804 further comprising system and user information. The system and user information comprises the time 806 the issue was received by the solution network, the user's customer number 808 and name 810, an order number 812 if applicable, the user's phone number 814, and a unique system identifier 816.

The GUI 802 also comprises an Agent Portal window 718, further comprising solution resources 878, a Knowledge Portal window 848, an Active Case window 820, a Session Management Control 818, and a Key Word Search field 820. In various embodiments, the Key Word Search field is operable to accept input, such as the symptoms of a user's issue, from the network solution specialist and then use the input to search the solution network for potential solutions. In one embodiment, the provided input comprises search words that are operable to be used in a search for potential solutions. In another embodiment, the search words comprise natural language. In another yet embodiment, the natural language search words are used to perform a natural language search query.

The Active Case window 820 further comprises a unique system identifier 816 field, user information 822, a System Configuration Information field 826, a Case Number field 830, and an Issue Resolution Status field 832. User information 822 further comprises a Customer Number field 808, an Order Number field 812, and an Invoice Date field 824. The Active Case window 820 also comprises a Case Number field 830, an Issue Resolution Status field 832, a tabbed Issue Resolution Journal window 834, and a tabbed Issue Resolution Audit Trail window 836. The Issue Resolution Journal window 834 further comprises an Issue Summary window 838 and an Issue Resolution Description window 840. In one embodiment, the Issue Summary 838 and Description 840 fields are auto-populated by the solution network. In another embodiment, the Issue Summary 838 and Description 840 fields are manually populated by a solution network specialist.

In one embodiment, a user establishes a network connection between their system and the solution network. Once the connection is established, preliminary user information, system information, and any on-the-box (OTB) diagnostics information associated with a system issue is automatically submitted by the system to the solution network. In another embodiment, preliminary user information, system information, and any on-the-box (OTB) diagnostics information associated with a system issue is submitted verbally by the user to a solution network specialist via a telephone conversation.

In one embodiment, the submitted information is used to retrieve additional information from a user and system information repository, which is then used to populate their associated fields in the Active Case window 820. In various embodiments, the retrieved information includes the user's customer number 808 if not already submitted, system order information, such as the user's order number 812, and system purchase information, such as the user's invoice date 824. Likewise, the retrieved information may also include user configuration information, previously provided solutions, historical issue resolution information, and historical solution resources providing the resolution information. In these embodiments, the retrieved information also includes system issue symptoms, a unique system identifier 816 if not previously submitted, system configuration information 826, system diagnostic information, system operating information, system service history information, and other system information required by the solution network. It will be appreciated that in various embodiments, OTB diagnostics information, when combined with user and system information, is operable to generate issue symptom information. In these various embodiments, this retrieved information, along with the submitted information, is analyzed by an issue analysis and solution search module of a knowledge management system.

Once the analysis is performed, it is used to perform a search of a solution network knowledge repository to determine potential solutions for the received issue. A plurality of potential solutions 858 resulting from the search are then displayed within the Results 850 window of the Knowledge Portal window 848. In one embodiment, the results of the search are filtered and categorized by their originating source for display in the tabbed Solution Network 852, Wiki 854, or Cases 856 windows of the Knowledge Portal window 848.

As shown in FIG. 8*a*, each of the potential solutions 858 resulting from the search has an originating source 860, an abstract 862, and a rating 864. In various embodiments, the plurality of potential solutions 858 is ranked based on its associated rating 864, with a higher rating indicating a more successful solution. As an example, the first 866 potential solution is indicated to have an originating source 860 of "Wizard" with its abstract 862 further indicating that it is a DVD diagnostic wizard. While the first 866 potential solution does not have a rating 864, its placement at the top of the list of potential solutions 858 indicates that it should be given precedence in resolving the issue displayed in the Issue Summary window 838. Likewise, the second 868 and third 870 potential solutions are indicated to have an originating source of "solution network". Their respective ratings 864 of 95% and 94% place them as the most successful of the displayed solutions in resolving issues having the same or similar symptoms as those displayed in the Issue Summary window 838. The fourth 872 potential solution is indicated to have an originating source of "Case", indicating that the source of the potential solution is the solution provided by the solution network to resolve a prior issue having similar symptoms. Its associated rating 864 of 87% may indicate that the previously provided solution may be inadequate to successfully resolve the issue displayed in the Issue Summary window 838.

In one embodiment, the solution network specialist selects the first 866 potential solution as a first step in resolving the issue displayed in the Issue Summary window 838. In this embodiment, selection of the "DVD Diagnostic Wizard" through a user gesture, such as a mouse-click with cursor 828, results in the DVD Diagnostic Wizard being run remotely on the user's system. The individual process steps and dialogs 874 are then displayed within the tabbed Results window 850. As shown in FIG. 8*a*, the DVD Diagnostic Wizard has failed, with the result that the solution network specialist selects "the drive is not detected by the operating system" dialog option with the cursor 828. Subsequently, the solution network specialist reviews each of the other potential solutions 868, 870 and 872, but fails to find a successful solution. As a result, the solution network specialist enters the results of their efforts 842 in the Description window 840 and then selects the Next command button 888 through a user gesture, such as a mouse-click with cursor 828.

Referring now to FIG. 8b, the solution network specialist decides to collaborate with one of a plurality solution resources 878 displayed within the Agent Portal window 876. In one embodiment, an analysis is performed by an issue analysis and solution search module of a knowledge management system on all information relating to the issue that has been collected and updated within the solution network. Once the analysis is performed, it is used to perform a search of a solution network knowledge repository to determine candidate solution resources to resolve the issue. The resulting candidate solution resources 878 resulting from the search are then displayed within the Agent Portal window 876. In one embodiment, each of the candidate solution resources has an effectiveness rating, with a higher effectiveness rating placing the solution resource at the top of a list of candidate solution resources.

Accordingly, the solution network specialist selects the first solution resource, "Andy Jones" 882, through a user gesture, such as a mouse-click with cursor 828. A Solution Resource Profile window 880 then displays information about the selected solution resource, including an image 882 (e.g., a photograph of another solution network specialist), their areas of specialization 884, and their effectiveness rating 886. Once the solution resource is selected, the solution network specialist selects the "Transfer" option of the Session Management Control 818 to transfer the issue, and all related information to the selected solution resource, "Andy Jones" 882.

The collaborating solution resource, "Andy Jones" 882, is then provided the same integrated view of the received issue as the solution network specialist, including issue description 892. Concurrently, the collaborating solution resource is presented a filtered view of potential solutions that indicates which of the solutions have been previously provided to the received issue. The solution network specialist then collaborates with the selected solution resource to provide a solution to the received issue. As shown in FIG. 8b, the collaborating solution resource determines a resolution 896 and enters a corresponding issue resolution description 896, which is then automatically entered into the Description window 844 of the tabbed Journal window 834. The collaborating solution resource then selects the Issue Resolved command button 890 through a user gesture, such as a mouse-click with cursor 828, to signify that the provided solution successfully resolved the issue.

Subsequently, as described in the issue resolution description 896, the collaborating solution resource creates a Wiki article describing the provided solution. The Wiki article is then linked to the case by selecting the Link New Wiki Article To Case command button 898, through a user gesture, such as a mouse-click with cursor 828. The provided solution, and its corresponding links, is then automatically entered into the Solution window 846 of the tabbed Journal window 834.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. Consequently, the invention is intended to be limited only by the spirit and scope of the appended claims, giving full cognizance to equivalents in all respects.

What is claimed is:

1. A computer-implementable method for providing potential solutions within a solution network, comprising:
    authoring a potential solution to an issue having an associated symptom;
    storing the potential solution in a solution repository;
    indexing the potential solution to the associated symptom;
    receiving a symptom of an issue;
    receiving user information, system information, and diagnostics information generated by on-the-box (OTB) diagnostics running on an information handling system of a user;
    receiving information relating to previously submitted user information, system information and diagnostics information and issue symptoms;
    searching the solution network based upon the received symptom as well as the user information, system information, and diagnostics information, the searching including accessing the solution repository; and,
    filtering potential solutions based upon the previously submitted user information, system information and diagnostics information and issue symptoms to determine whether a solution was previously provided to the user; and wherein
    a plurality of symptoms are presented in a tree format, the tree format enabling a user to navigate through symptoms one at a time, the tree format enabling the user to pick and choose particular symptoms.

2. The method of claim 1, further comprising:
    providing results of a search, the results comprising a potential solution indexed to the received symptom.

3. The method of claim 1, wherein the received symptom is generated in response to user input.

4. The method of claim 3, wherein the user input is guided by business rules.

5. The method of claim 3, wherein the user input is guided by a wizard.

6. The method of claim 3, wherein the user input comprises a symptom selected from the plurality of symptoms presented to the user.

7. The method of claim 3, wherein the user input comprises search words.

8. The method of claim 3, wherein the user input comprises natural language.

9. The method of claim 1, wherein the search comprises a natural language search query.

10. A non-transitory computer readable medium embodying computer program code, the computer program code comprising computer executable instructions configured for:
- authoring a potential solution to an issue having an associated symptom;
- storing the potential solution in a solution repository;
- indexing the potential solution to the associated symptom;
- receiving a symptom of an issue;
- receiving user information, system information, and diagnostics information generated by on-the-box (OTB) diagnostics running on an information handling system of a user;
- receiving information relating to previously submitted user information, system information and diagnostics information and issue symptoms;
- searching the solution network based upon the received symptom as well as the user information, system information, and diagnostics information, the searching including accessing the solution repository; and,
- filtering potential solutions based upon the previously submitted user information, system information and diagnostics information and issue symptoms to determine whether a solution was previously provided to the user; and wherein
- a plurality of symptoms are presented in a tree format, the tree format enabling a user to navigate through symptoms one at a time, the tree format enabling the user to pick and choose particular symptoms.

11. The non-transitory, computer-readable storage medium of claim 10, wherein the computer executable instructions further comprise computer executable instructions configured for:
- providing results of a search, the results comprising a potential solution indexed to the received symptom.

12. The non-transitory, computer-readable storage medium of claim 10, wherein the received symptom is generated in response to user input.

13. The non-transitory, computer-readable storage medium of claim 12, wherein the user input is guided by business rules.

14. The non-transitory, computer-readable storage medium of claim 12, wherein the user input is guided by a wizard.

15. The non-transitory, computer-readable storage medium of claim 12, wherein the user input comprises a symptom selected from the plurality of symptoms presented to the user.

16. The non-transitory, computer-readable storage medium of claim 12, wherein the user input comprises search words.

17. The non-transitory, computer-readable storage medium of claim 12, wherein the user input comprises natural language.

18. The non-transitory, computer-readable storage medium of claim 10, wherein the search comprises a natural language search query.

19. A system for providing potential solutions within a solution network executing on at least one information handling system, comprising:
- a potential solution, the potential solution authored for an issue having an associated symptom;
- a solution repository, the potential solution stored in the solution repository, the solution repository being stored within a storage device of the at least one information handling system;
- an potential solution index, the potential solution indexed to the associated symptom;
- a received symptom of an issue;
- user information, system information, and diagnostics information generated by on-the-box (OTB) diagnostics running on an information handling system of a user;
- previously submitted user information, system information and diagnostics information and issue symptoms;
- a search of the solution network, the search based upon the received symptom as well as the user information, system information, and diagnostics information, the searching including accessing the solution repository; and,
- a potential solutions filter, the possible solutions filter filtering potential solutions based
- upon the previously submitted user information, system information and diagnostics information and issue symptoms to determine whether a solution was previously provided to the user; and wherein
- a plurality of symptoms are presented in a tree format, the tree format enabling a user to navigate through symptoms one at a time, the tree format enabling the user to pick and choose particular symptoms.

20. The system of claim 19, further comprising:
results of a search, the results of the search available to be provided and comprising a potential solution indexed to the received symptom.

21. The system of claim 19, wherein the received symptom is generated in response to user input.

22. The system of claim 21, wherein the user input is guided by business rules.

23. The system of claim 21, wherein the user input is guided by a wizard.

24. The system of claim 21, wherein the user input comprises a symptom selected from the plurality of symptoms presented to the user.

25. The system of claim 21, wherein the user input comprises search words.

26. The system of claim 21, wherein the user input comprises natural language.

27. The system of claim 19, wherein the search comprises a natural language search query.

* * * * *